US012641482B2

(12) United States Patent (10) Patent No.: US 12,641,482 B2
Ciochina-Kar et al. (45) Date of Patent: May 26, 2026

(54) COMMUNICATION DEVICES AND METHODS

(71) Applicant: Sony Group Corporation, Tokyo (JP)

(72) Inventors: Dana Ciochina-Kar, Stuttgart (DE);
Thomas Handte, Stuttgart (DE);
Daniel Verenzuela, Stuttgart (DE)

(73) Assignee: SONY GROUP CORPORATION,
Tokyo (JP)

( * ) Notice: Subject to any disclaimer, the term of this patent is extended or adjusted under 35 U.S.C. 154(b) by 441 days.

(21) Appl. No.: 18/034,063

(22) PCT Filed: Oct. 29, 2021

(86) PCT No.: PCT/EP2021/080078
§ 371 (c)(1),
(2) Date: Apr. 27, 2023

(87) PCT Pub. No.: WO2022/090441
PCT Pub. Date: May 5, 2022

(65) Prior Publication Data
US 2023/0308943 A1 Sep. 28, 2023

(30) Foreign Application Priority Data

Oct. 30, 2020 (EP) ..................................... 20204987

(51) Int. Cl.
H04W 28/06 (2009.01)
H04L 5/00 (2006.01)
H04W 74/0816 (2024.01)
(52) U.S. Cl.
CPC ........... H04W 28/06 (2013.01); H04L 5/0053 (2013.01); H04W 74/0816 (2013.01)
(58) Field of Classification Search
None
See application file for complete search history.

(56) References Cited

U.S. PATENT DOCUMENTS

2011/0044298 A1* 2/2011 Wentink ................ H04L 5/0023
370/336
2019/0349960 A1 11/2019 Li et al.
(Continued)

FOREIGN PATENT DOCUMENTS

JP 2006129393 A 5/2006
JP 2020099060 A 6/2020
(Continued)

OTHER PUBLICATIONS

International Search Report and Written Opinion mailed on Feb. 18, 2022, received for PCT Application PCT/EP2021/080078, filed on Oct. 29, 2021, 11 pages.
(Continued)

*Primary Examiner* — Saumit Shah
(74) *Attorney, Agent, or Firm* — XSENSUS, LLP

(57) ABSTRACT

The present disclosure relates to the concept of preempting PPDUs, i.e., truncating a PPDU carrying non-latency sensitive traffic to serve STAs with latency constraints. A first communication device comprises circuitry configured to receive a truncation notification during an ongoing exchange of data units with a second communication device, the truncation notification indicating that the ongoing transmission of a data unit shall be truncated and a preemptive data unit shall be received from and/or transmitted to the third communication device, terminate the ongoing transmission of the data unit before the estimated transmission time of the data unit, and receive from and/or transmit to the third communication device the preemptive data unit within the remaining duration of the truncated data unit or within the remaining duration of the transmit opportunity, established between the first and the second communication devices for the ongoing data unit exchange.

19 Claims, 17 Drawing Sheets

110 receive truncation notification — 111 terminate ongoing transmission — 112 receive/ transmit preemptive data unit — 113

(56) References Cited

U.S. PATENT DOCUMENTS

| | | | |
|---|---|---|---|
| 2020/0205173 A1 | 6/2020 | Frederiksen et al. | |
| 2020/0367263 A1* | 11/2020 | Cavalcanti | H04W 72/12 |
| 2021/0274544 A1* | 9/2021 | Yang | H04W 72/569 |
| 2022/0217760 A1* | 7/2022 | Iyer | H04L 1/1887 |
| 2023/0247668 A1* | 8/2023 | Akhmetov | H04W 74/0816 |
| | | | 370/329 |
| 2025/0039786 A1* | 1/2025 | Ho | H04W 28/0268 |

FOREIGN PATENT DOCUMENTS

| | | |
|---|---|---|
| WO | 2020/064220 A1 | 4/2020 |
| WO | 2020/174015 A1 | 9/2020 |

OTHER PUBLICATIONS

"Part 11: Wireless LAN Medium Access Control (MAC) and Physical Layer (PHY) Specifications", IEEE P802.11ax™/D6.0, IEEE Computer Society, Nov. 2019, pp. 1-780.

"Part 11: Wireless LAN Medium Access Control (MAC) and Physical Layer (PHY) Specifications", IEEE Computer Society, IEEE Std 802.11™-2016, Dec. 7, 2016, pp. 1-3530.

Yoshifumi Hotta, et al, "Ethernet-based Time Sensitive Networking Technologies for IoT", Mitsubishi Electric Technical Report, vol. 90—No. 7, 2016, pp. 30(406)-34(410).

* cited by examiner

120

310

All data units with Ack policy set to "no Ack" or "Block Ack"

PPDU truncation

AP sPPDU pPPDU sSTA sPPDU pSTA pPPDU

Fig. 16B

AP MAC                                                    AP SME

Truncation
Notification.Request

Truncation
Notification.Confirm

COMMUNICATION DEVICES AND METHODS

CROSS-REFERENCE TO RELATED APPLICATIONS

The present application is based on PCT filing PCT/EP2021/080078, filed Oct. 29, 2021, which claims priority to EP 20204987.0, filed on Oct. 30, 2020, the entire contents of each of which are incorporated herein by reference.

BACKGROUND

Field of the Disclosure

The present disclosure relates to first and second communication device for communication there between. The present disclosure relates further to corresponding communication methods.

Description of Related Art

WLAN, as defined in IEEE 802.11-2016, implements packet-based data transmission. When one or more input data packets or MSDUs (MAC layer service data unit) are present and the wireless channel is free, these MSDUs are processed by the MAC layer to one or more MPDUs (MAC layer protocol data unit) and by the PHY layer, before they are transmitted to one or more peer WLAN communication device as PPDUs (physical layer protocol data unit).

Certain restrictions apply to the length of such a PPDU, measured on the wireless channel. These restrictions limit the maximum length or transmit time to a range from 2 ms to 10 ms (sometimes 20 ms) depending on the considered standard. The transmit time is determined and fixed at the beginning of a PPDU transmission. A long transmit time is favorable for high efficiency in communications as the overhead for gaining channel access, preamble transmission, and/or control frame transmission gets negligible.

In the context of low-latency communications, an access point (AP) or a station (STA) may want to transmit both non-latency sensitive and latency sensitive data packets. Often, the arrival of a latency sensitive packet is random, unknown, and unpredictable. Thus, it may happen that a transmission of one or more non-latency sensitive MSDUs has just started when one or more latency sensitive MSDUs arrive. According to the current WLAN behavior, the ongoing PPDU transmission is required to finish before a new PPDU transmission that conveys the latency sensitive MSDUs can be initiated. Thus, the latency sensitive MSDUs may need to wait unacceptably long for their transmission.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide a communication devices and method that deal in an improved manner and with correct behavior, in particular with respect to determining parameters related to channel access and accessing the channel in situations where an ongoing data transmission is truncated in order to allow a low latency sensitive traffic exchange. It is a further object to provide a corresponding computer program for implementing a communication method and a non-transitory computer-readable recording medium for implementing a communication method.

According to an aspect there is provided a first communication device configured to communicate with a second communication device and a third communication device, the first communication device comprising circuitry configured to receive a truncation notification during an ongoing exchange of data units with the second communication device, the truncation notification indicating that the ongoing transmission of a data unit shall be truncated and a preemptive data unit shall be received from and/or transmitted to the third communication device, terminate the ongoing transmission of the data unit before the estimated transmission time of the data unit, and receive from and/or transmit to the third communication device the preemptive data unit within the remaining duration of the truncated data unit or within the remaining duration of the transmit opportunity, established between the first and the second communication devices for the ongoing data unit exchange.

According to an aspect there is provided another first communication device configured to communicate with a second communication device and a third communication device, the first communication device comprising circuitry configured to receive a truncation notification during an ongoing exchange of data units with the second communication device, the truncation notification indicating that the ongoing transmission of a data unit shall be truncated and a preemptive data unit shall be received from and/or transmitted to the third communication device, transmit an end notification indicating the end of the current transmit opportunity before the end of the current transmit opportunity, and establish a new transmit opportunity with the third communication device, wherein the duration of said new transmit opportunity covers at least the transmission of the preemptive data to and/or the reception of the preemptive data from the third communication device.

According to a further aspect there is provided a third communication device configured to communicate with a first communication device, the third communication device comprising circuitry configured to receive a data unit addressed to a second communication device, determine a duration indication indicating the expected duration of an ongoing transmission of a data unit and/or of an ongoing transmit opportunity, determine if transmission of a data unit has been terminated before the estimated transmission time of the data unit, and receive from and/or transmit to the first communication device a preemptive data unit within the remaining duration of the truncated data unit and/or within the remaining duration of the transmit opportunity.

According to still further aspects corresponding first and second communication methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is the concept of preempting PPDUs, i.e., truncating a PPDU carrying non-latency sensitive traffic to serve STAs with latency constraints. A further aspect deals with enhancements to enable correct behavior at the STA which is the reason for truncation, i.e., the STA which requires the immediate update or from which an immediate update is required.

In the context of the present disclosure, the first communication device is also called "access point" or "AP", the second communication device is also called "starting station" or "sSTA" and the third communication device is also called "preemptive station" or "pSTA".

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
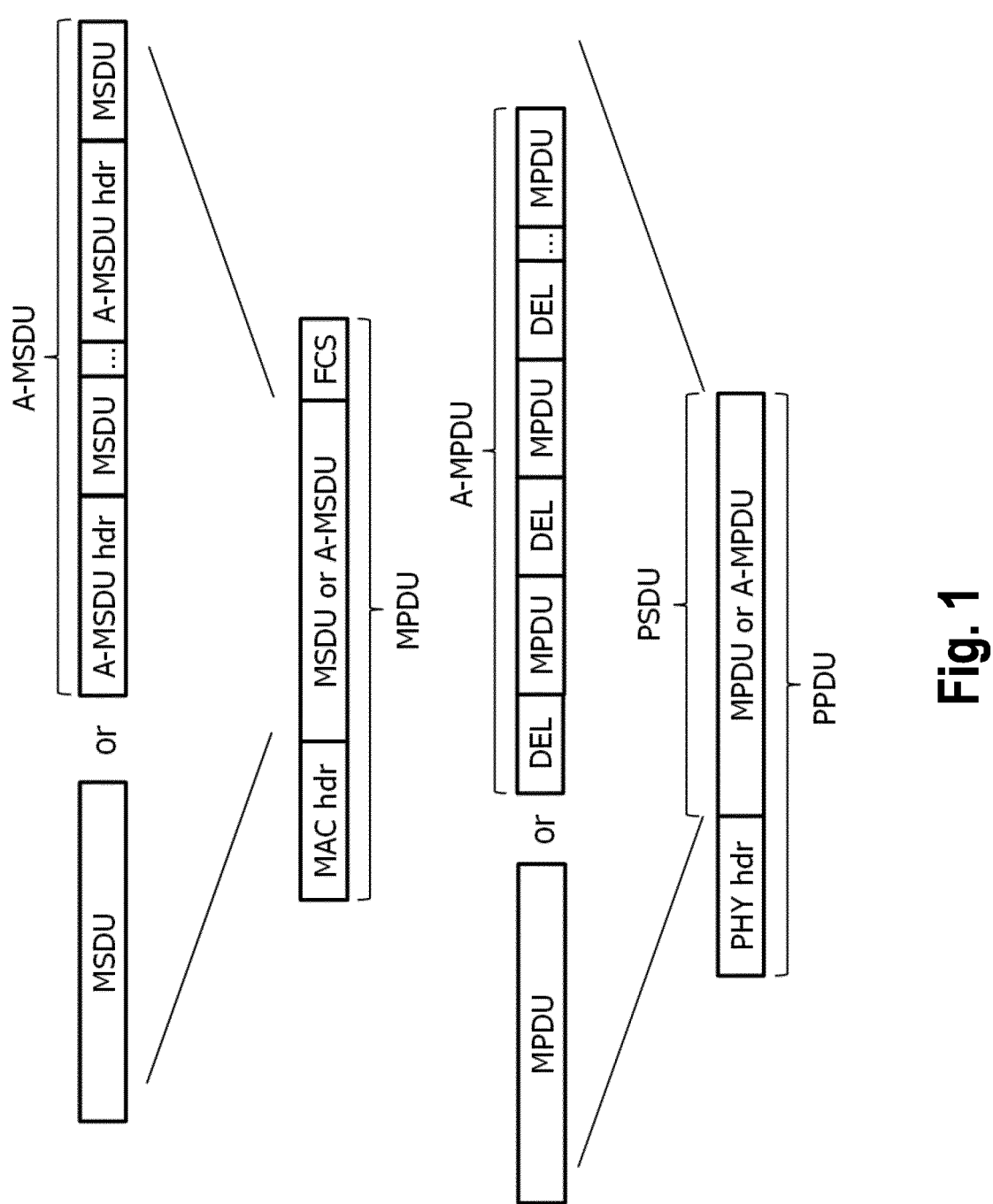
FIG. 1 shows a diagram illustrating the relation and construction of data units in conventional WLAN.

Referring now to the drawings, wherein like reference numerals designate identical or corresponding parts throughout the several views, FIG. 1 shows the generally known relation and construction of data units in WLAN, in particular of MSDUs or A-MSDUs (aggregated MSDUs), MPDUs, PSDUs (physical layer service data units) and PPDUs.

According to the present disclosure a PPDU transmission, i.e. a transmission of a data unit, shall be truncated (or interrupted) without losing data that has already been transmitted. It can thus be considered as a receiver friendly truncation of an ongoing PPDU transmission.

Figures 2, 3:
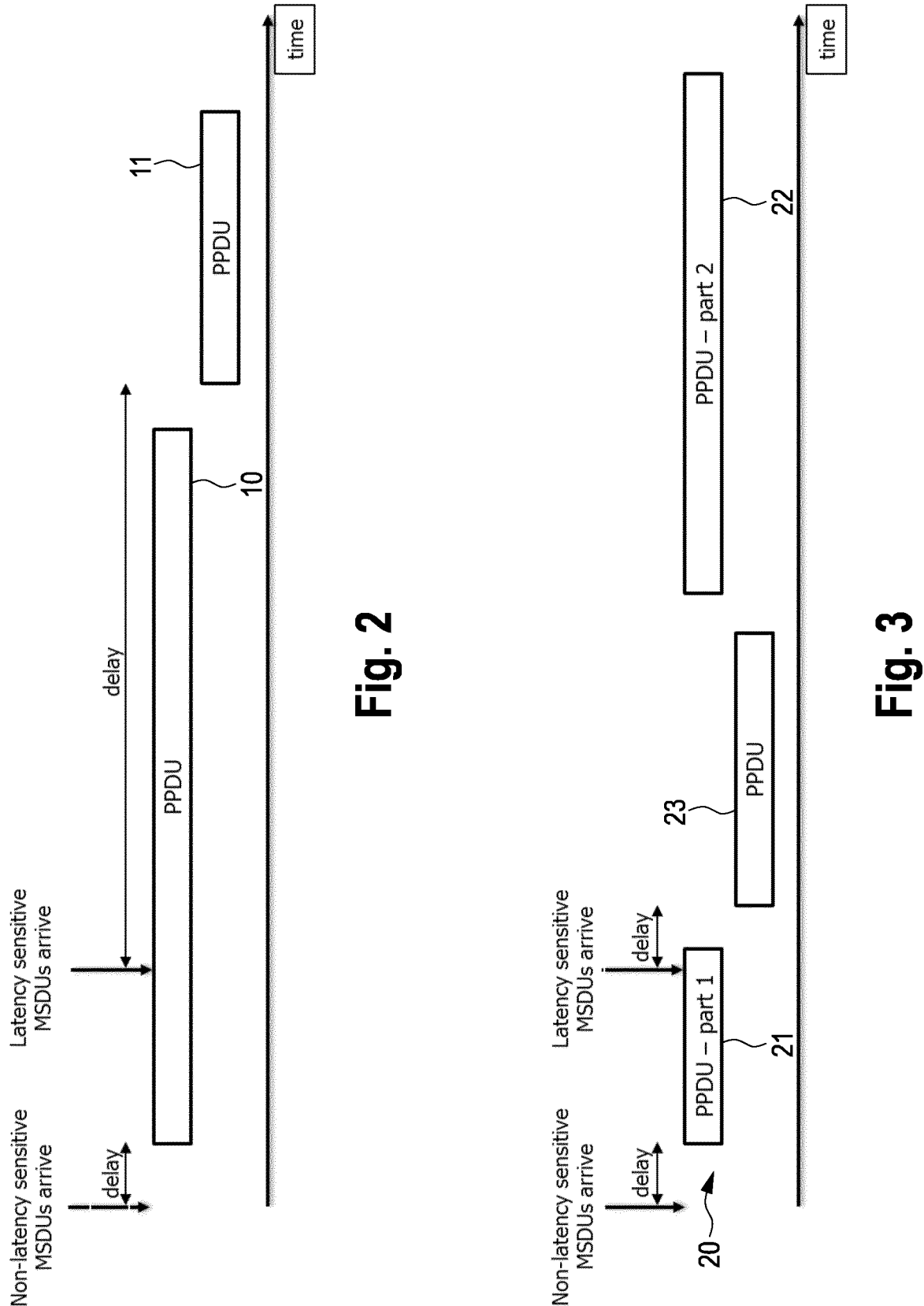
FIG. 2 shows a diagram illustrating non-latency and latency sensitive data transmission without PPDU truncation.
FIG. 3 shows a diagram illustrating non-latency and latency sensitive data transmission with PPDU truncation.

FIGS. 2 and 3 show diagrams illustrating the benefit of PPDU truncation with respect to low latency communications. According to FIG. 2 PPDU truncation is not used; according to FIG. 3 PPDU truncation is used. It shall be noted that both figures illustrate the conventional WLAN behavior and that the MSDU arrival times are equal in both figures.

According to FIG. 2, the PPDU 10 holding the non-latency sensitive MSDUs is required to be finished before the latency sensitive MSDUs held in the PPDU 11 can be transmitted. This causes an unwanted queuing delay for the latency sensitive MSDUs because the latency sensitive MSDUs need to be buffered in a queue or memory until they can be transmitted. According to FIG. 3, however, the truncation of the PPDU 20 holding non-latency sensitive data into two PPDU parts 21 and 22 allows for a speedy transmission of the PPDU 23 holding the latency sensitive data. Thus, the queuing delay of the latency sensitive MSDUs is smaller compared to FIG. 2. The queuing delay of the non-latency sensitive data increases in FIG. 3 compared to FIG. 2 PPDU truncation can provide a trade-off of queuing delay of different traffic types but not a reduction. It should be noted that non-latency sensitive and latency-sensitive MSDUs may target different STAs.

Within WLAN PHY and MAC layer signal processing may in an embodiment be done block-wise. Several processing steps have different block lengths. The block lengths that may be respected for the envisioned PPDU truncation operation are LDPC code word length, OFDM symbol length, and MPDU data unit.

The MPDU data unit consists of (i) header information, (ii) (encrypted) user data, often MSDU, and (iii) frame check sequence (FCS). The FCS is used to detect transmission errors within the user data and/or header information. In case an error is detected, the MPDU is discarded and a retransmission may be requested from the transmitter of that MDPU. One or more MPDUs may be aggregated to an A-MPDU for transmission in a single PPDU (FIG. 1). Once the PSDU, i.e. MPDU or A-MPDU, is readily available in the MAC layer, i.e. at least the amount of data to be transmitted is known, the PHY layer is triggered for transmission.

Figure 4:
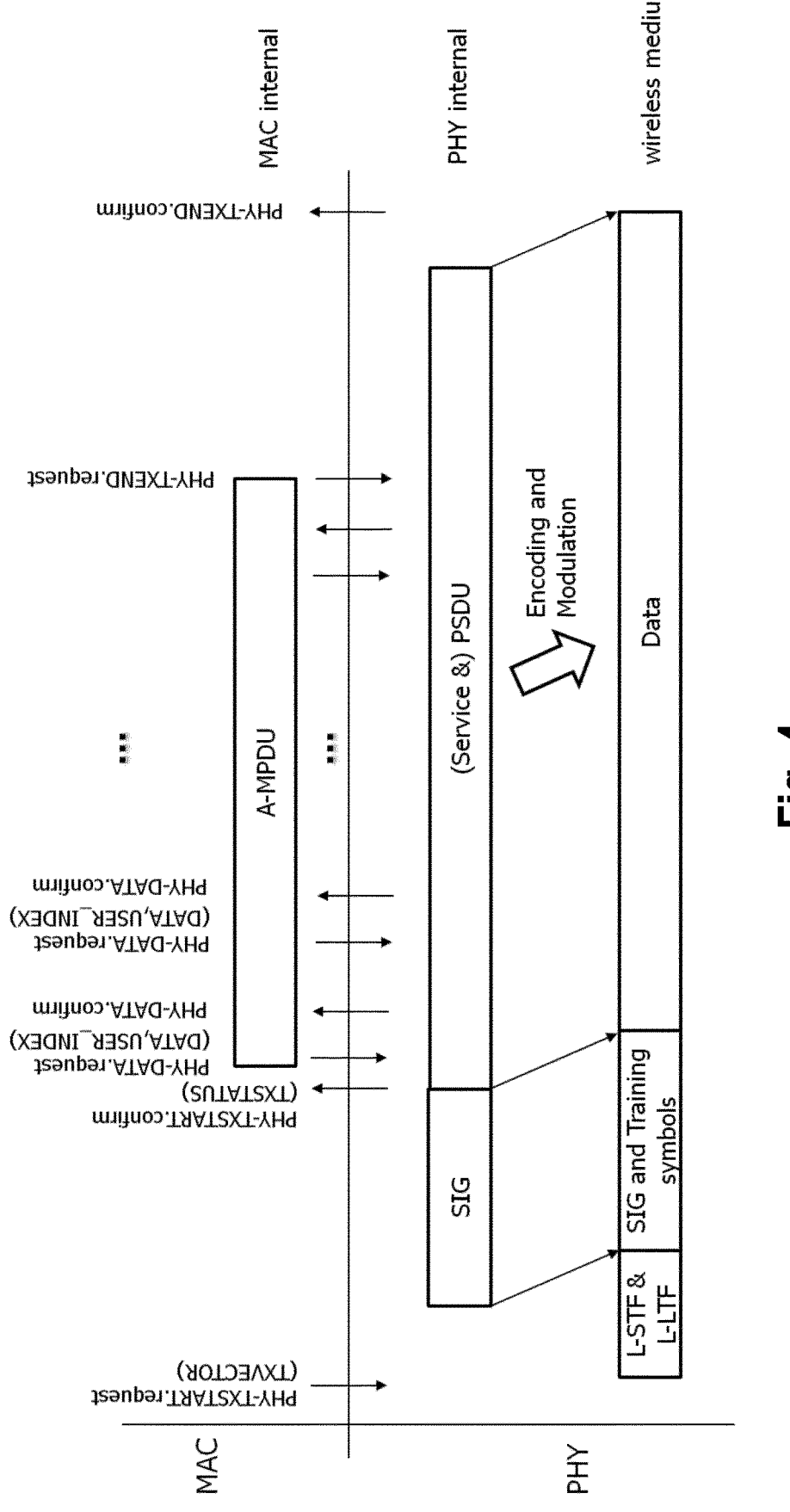
FIG. 4 shows a diagram illustrating the interaction between PHY and MAC for a transmission in WLAN.

FIG. 4 shows the interaction between PHY and MAC for a transmission, i.e. initiation of a PPDU transmission and data transfer between MAC and PHY. The MAC triggers the PHY to start transmission by PHY-TXSTART.request (TXVECTOR) function (or primitive). This request includes the TXVECTOR which holds one or more configuration parameters for the PHY such as length information of PHY input data unit (PSDU), modulation coding scheme (MCS), i.e. code rate and constellation diagram size, number of spatial streams, MIMO mode, bandwidth and RU size, etc.

Figure 5:
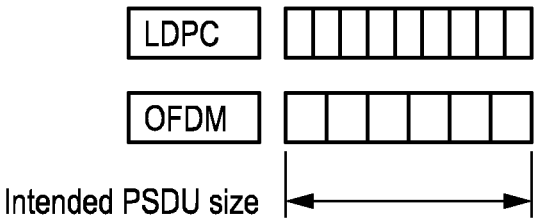
FIG. 5 shows a diagram illustrating block sizes in the PHY layer.

Based on this information the PHY determines block sizes for LDPC and OFDM modulation and their respective structure. This process holds various steps and is omitted here because this is not part of the disclosed solution. The different block sizes are determined such that at least at the end (and preferably at the beginning as well) of the PSDU the borders of all blocks coincide. These block sizes and related block structures are kept fixed during the entire encoding and modulation process for the respective PPDU. FIG. 5 visualizes the block-wise operation and coincidence of block borders at the beginning and end of a PSDU.

In FIG. 4, following the PHY-TXSTART.request and block size computation, the PHY starts transmitting channel estimation sequences (STF, LTF) and training symbols as well as signaling information (SIG). The signaling information is used by the receiver to configure its PHY for reception of that PPDU. Once the SIG field data is compiled, the PHY reports to the MAC its readiness for data exchange by issuing the PHY-TXSTART.confirm (TXSTATUS) primitive. Following that, the MAC sends data to the PHY by using the PHY-DATA.request (DATA, USER_INDEX) primitive. Thereby, DATA holds the actual data to be transmitted for the user identified by USER_INDEX. Often, the DATA is of size 1 octet. The PHY confirms successful data transfer by issuing the PHY-DATA.confirm primitive. The data exchange continues until the MAC issues the PHY-TXEND.request indicating to the PHY to terminate transmission. After that the PHY notifies the MAC that transmission ended by PHY-TXEND.confirm once it does not transmit on the wireless medium anymore.

In the context of real time application (RTA), an AP needs to service STAs within its basic service set (BSS) that have stringent constraints in point of latency and jitter. On the other hand, PPDUs defined currently in WLAN can have relatively long transmission times e.g., up to 5 ms. Therefore, the concept of preempting PPDUs, i.e., truncating a PPDU carrying non-latency sensitive traffic to serve STAs with latency constraints has emerged. A truncation of the PPDU transmission may be performed by the MAC at any time by the PHY-TXEND.request primitive. However, truncating in this manner can lead to an incomplete last OFDM symbol, thus partially damages the PPDU, which cannot be demodulated by the receiver and results in data loss. Furthermore, it is not clear to the receiver what caused the PPDU truncation e.g., it could be carrier loss, interference as well as an intentional truncation. In order to enable a receiver to correctly decode the content of the PPDU up to the truncation, in case of an early termination of a PPDU, specific padding techniques need to be designed.

In the present disclosure further enhancements to enable correct and fair distribution of channel access parameters as well as new rules for channel access for the STAs for which the truncation was intended are proposed. Further, aspects related to channel access are discussed to ensure correct setting of network allocation vectors (NAVs) not only for the STAs directly involved but also for the rest of the STAs listening to the medium in order to find access opportunities.

Figure 6:
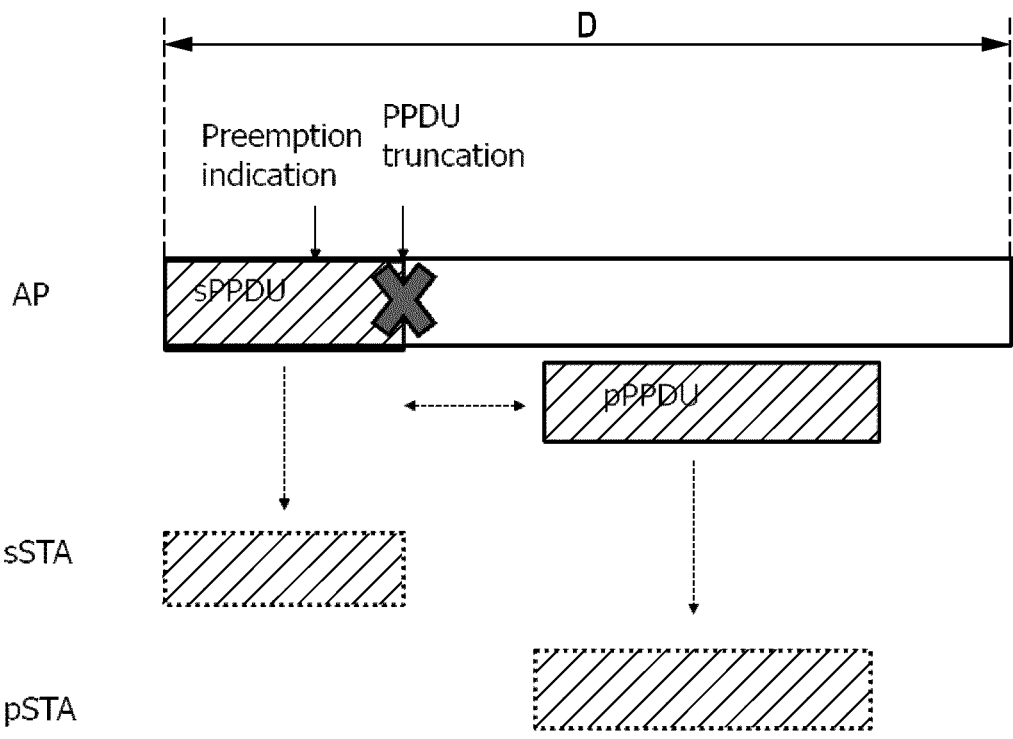
FIG. 6 schematically shows a first scenario for application of the present disclosure.
Figure 7:
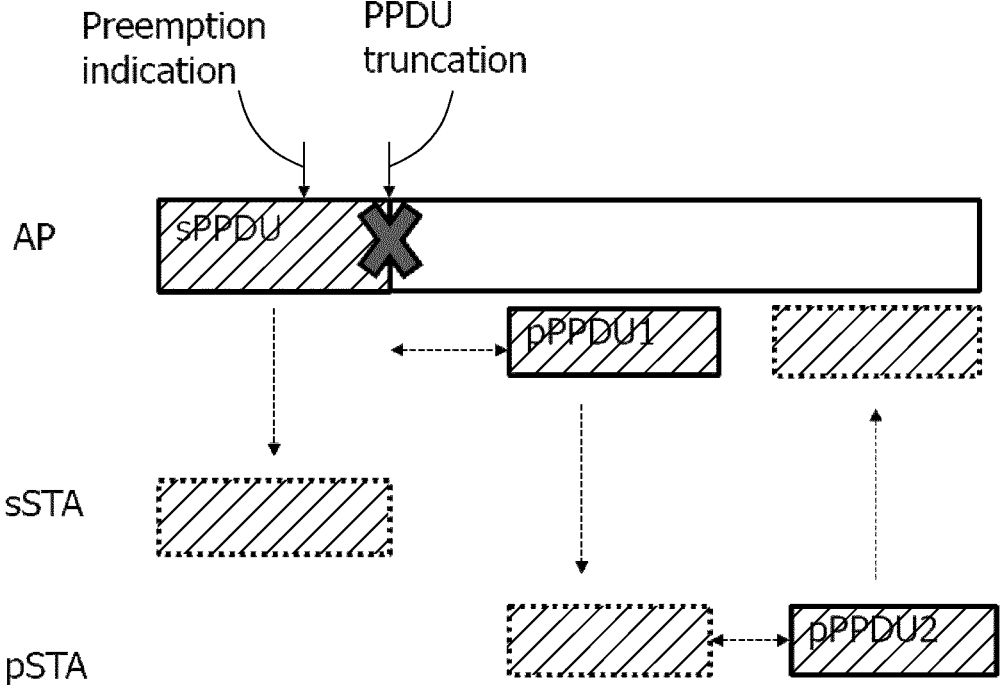
FIG. 7 schematically shows a second scenario for application of the present disclosure.
Figure 8:
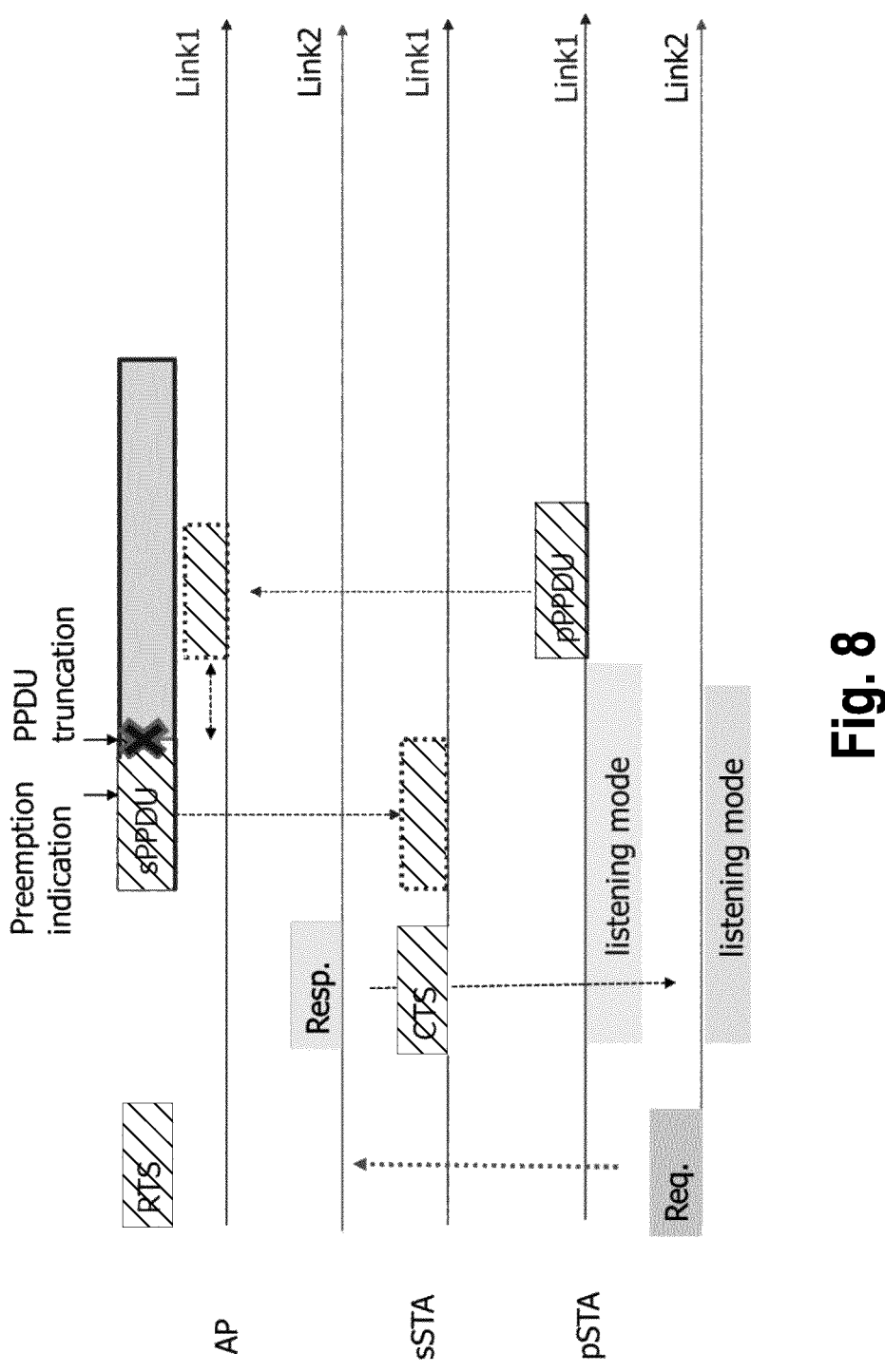
FIG. 8 schematically shows a third scenario for application of the present disclosure.

The scenarios that are considered hereinafter are depicted in FIGS. 6 to 8.

A first scenario using downlink (DL) PPDU truncation for DL transmission to a preemptive STA (pSTA) is schematically depicted in FIG. 6. In this scenario the AP (herein also called first communication device) sends a PPDU (herein generally also called starting data unit or sPPDU) towards an initial STA (herein also called second communication device or starting STA, sSTA). At a certain point during the sPPDU transmission, the upper layers of the AP indicate the need to send high priority data to a different STA (herein also third first communication device or pSTA). As a result, after a processing delay (pDelay), the sPPDU is truncated, the transmission to the sSTA is stopped and after a given time interval interframe space (IFS) the AP sends a new PPDU (herein also called preemptive data unit or pPPDU) to pSTA. In FIG. 6 the duration D is shown, which indicates the originally intended transmission time of the sPPDU to the sSTA 300. Thus, D is the duration of the sPPDU in case no truncation is performed. The duration D of the originally intended sPPDU, can be estimated by the STAs which are able to decode the preamble of the sPPDU, i.e., sSTA 300 and pSTA 100, e.g., from information present in the preamble fields.

A second scenario using DL PPDU truncation for uplink (UL) transmission from a pSTA is schematically depicted in FIG. 7. This scenario is an extension of the first scenario, wherein the main difference is that not only the DL transmission from the AP occurs after the truncation but also a response from the pSTA. This scenario is depicted in a general sense and covers e.g. the following particular cases:

i) The first pPPDU (pPPDU1) sent by the AP contains high priority data towards pSTA with normal/implicit Ack policy and/or aggregated with a BAck Request frame, while pPPDU2 contains an Acknowledgement or Block Acknowledgment.

ii) The AP requires an urgent update from pSTA and interrupts the transmission to the sSTA to obtain this update. In order to enable correct channel access in this case, according to an embodiment it is proposed to first send a frame from the AP by which a data transmission from the pSTA is requested and channel access parameters for the following communication are set. This will be followed within an interframe space by the PPDU from the pSTA containing the required update. The pPPDU1 can be a Trigger Frame (TF), as defined, e.g., in IEEE 802.11ax, triggering the transmission of pPPDU2, or a simplified version of this but with similar functionality (e.g., comprising of a start indication and basic RU/BW allocation is needed).

iii) The AP has received an indication from a different link from a pSTA that it has urgent data to transmit. Subsequently, the AP allows the transmission after preempting the sPPDU however in order to ensure correct channel access parameters, according to an embodiment it is proposed to first send a frame to trigger the transmission from pSTA and inform the channel access parameters for the transmission. Thus, an example of the content of the pPPDU1 and pPPDU2 is a trigger frame and the data PPDU respectively.

When the STAs have multi-link capabilities and the preemption request is performed over a different link than the one where the transmission will occur, the triggering frame as presented in case iii), is proposed as an easy implementation which can ensure correct channel access and consistent duration information on the link. However, it also incurs delays so that an operation without it can also be desired when latency requirements are strict. Thus, a third scenario may be considered using Direct UL access for pPPDUs after sPPDU truncation as schematically depicted in FIG. 8.

One requirement in this case is that the pSTA listens to the link, where the truncation will be performed at least since the beginning of the sPPDU, such that it has decoded the preamble information. The mechanism of requesting pre-emption over a link different than the one where the DL transmission and the truncation is performed is out of the scope of this disclosure. However, for completeness an example of the multi-link relations in FIG. 8 as well. The focus here is only on the channel access after a truncation occurs and on ensuring the transmit opportunity (TXOP) consistency on the specific link, the TXOP representing the intended duration of the data exchange should a truncation not have occurred.

In order to ensure a correct behavior for the scenarios depicted in FIGS. 6 to 8, pSTA Channel Access, AP Channel Access and Ack Behavior of sSTA should be ensured.

pSTA Channel Access refers to mechanisms enabling the pSTA to access the channel in order to transmit a preemptive data unit or a response to a preemptive data unit e.g., an Acknowledgement. Within a WLAN environment, a common mechanism is based on network allocation vectors (NAV), which hold information of the medium occupancy and are updated periodically based on duration information of frames received from intended or unintended transmitters. When STAs receive a frame, they determine the duration for which the medium is occupied and refrain from accessing the channel or competing for channel access during this interval. Such a behavior may create limitations in case of preemption. This is because once the transmission to an sSTA has started the preemptive STA is seeing the medium busy and is not allowed to transmit during the duration of the data exchange between the AP and the sSTA. Thus, according to the current rules, an sSTA is not able to transmit the preemptive data or a response to a preemptive data until the end of the initially intended transmission opportunity.

Furthermore, according to the double NAV mechanism defined in IEEE 802.11ax, a pSTA could potentially reset its intra-BSS NAV (i.e., the NAV for STAs within its own BSS) if it is the recipient of a trigger frame, which requests it to transmit. However, under the current amendment of the standard, a reset of the intra-BSS NAV is only possible after the end of the PPDU carrying this indication and only as response to a trigger frame. Only an inter-BSS (or basic NAV) can be updated before the end of the PPDU. Therefore, based on current rules a pSTA cannot initiate any transmission to the AP after the PPDU truncation, particularly in the scenarios depicted in FIGS. 7 and 8.

AP Channel Access in the context of this proposal refers to several aspects. Firstly, it refers to sharing or truncating transmit opportunities obtained for one sSTA, in case the AP needs to perform a preemptive transmission to a pSTA. Secondly, it refers to distributing correct duration information such that STAs are having similar NAV information, regardless of whether these are hearing the truncated transmissions or not. Finally, it refers to mechanisms performed by the AP in order to facilitate the pSTA channel access. Regarding the first point, a transmit opportunity is obtained for traffic of one specific access category (AC) which becomes the primary access category. There are strong limitations regarding TXOP sharing in the current standards. Regarding the second point, transmitting the pPPDU has to respect transmit opportunity limits in order to avoid creating access problems, i.e., collisions for STAs which have already updated their network allocation vectors, according to the existing rules. However, there are limitations.

TXOP sharing is only allowed under restrictive conditions, a main one being that the duration of the primary AC is not exceeded. In certain environments, e.g. SU, the transmission of the primary AC has to be first completed before sharing the remaining TXOP transmission with another AC, and the particular AC has to have higher priority.

NAV information is updated in all frames based on duration information within the MAC headers as long as such information can be retrieved. Furthermore, a PHY indication of the duration is also available within the pre-amble for HE STAs, which can be used when the MAC indication cannot be retrieved. Based on information regarding the duration of the following transmission opportunity, as well as information regarding the length of the PPDU containing this information, STAs determine the medium utilization and next possible transmission times from their side. Thus, the PPDU limits as well as the transmit opportunity limits are of importance for STAs correctly deciding on channel access. Consequently, a preemption scheme truncating a PPDU to allow transmission to a different STA should be done such that the two boundaries are consistent with the ones for which the initial PPDU and TXOP duration were advertised.

Ack behavior of sSTA refers to the mechanisms by which the sSTA sends an acknowledgement to the AP, informing whether all the MPDUs sent by the AP have been correctly received and, if not, which MPDUs are missing. There are several mechanisms by which an Ack can be requested or sent. In the particular case of the current proposal special attention should be given to this in order to avoid collisions between the PPDUs carrying Ack frames from the sSTA and the preemptive data transmission. A scheme to avoid this problem according to an embodiment will be explained below with reference to FIG. 16.

Figure 9:
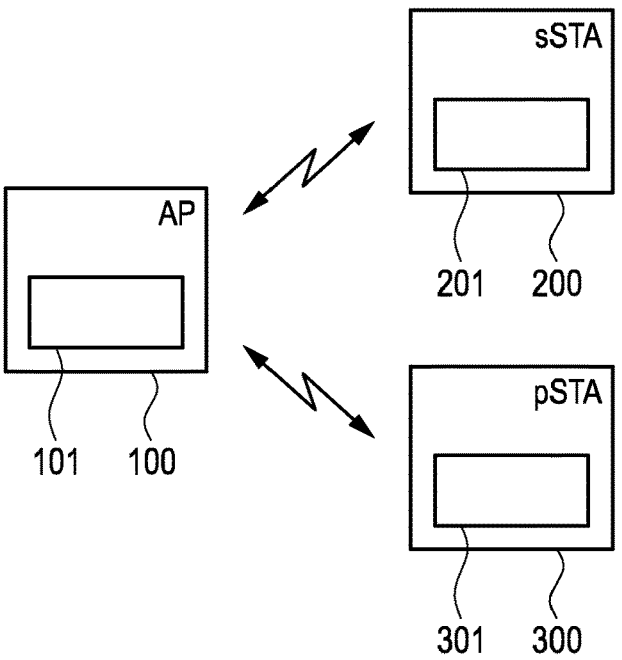
FIG. 9 shows a schematic diagram of communication devices according to the present disclosure.

FIG. 9 shows a diagram illustrating a first communication device 100 (e.g. an access point, AP) according to an aspect of the present disclosure for communicating with a second communication device 200 (herein also called start station, sSTA) and a third communication device 300 (herein also called preemptive station, pSTA) on a wireless channel. The first communication 100 is thus able to exchange (receive and/or transmit) data with the second communication device 200 and the third communication device 300.

Each of the communication devices 100, 200, 300 comprises circuitry 101, 201, 301 configured to perform particular operations. The circuitries may be implemented by a respective processor or computer, i.e. as hardware and/or software, or by dedicated units or components. For instance, respectively programmed processors may represent the respective circuitries 101, 201, 301.

Figure 10:
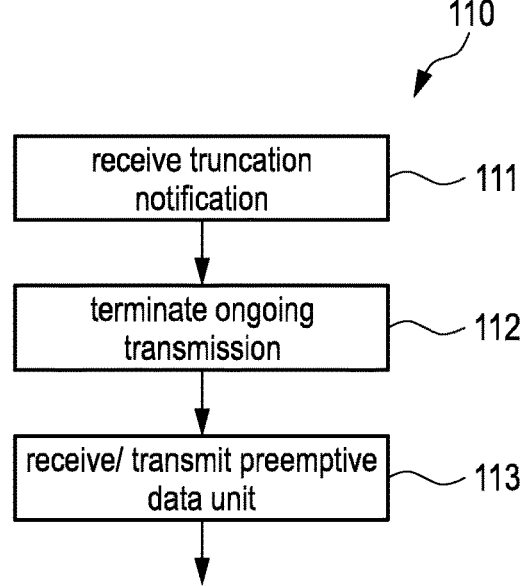
FIG. 10 shows a flow chart of an embodiment of a communication method of the first communication device according to the present disclosure.

FIG. 10 shows a flow chart of an embodiment of a first communication method 110 of the first communication device 100 (the AP) according to the present disclosure, which may be performed of by the circuitry 101. In a first step 111 the AP receives a truncation notification during an ongoing exchange of data units with the second communication device. The truncation notification indicates that the ongoing transmission of a data unit shall be truncated, if truncation conditions are satisfied and a preemptive data unit shall be received from and/or transmitted to the third communication device. The truncation notification may indicate that there is a high priority low latency traffic/traffic with higher priority than contained in the ongoing transmission during the ongoing transmit opportunity. Once a truncation notification is received, it should first be determined if it is possible to perform a truncation (i.e., if it fits within the duration, STA is eligible to process a truncated transmission) and only then decide to truncate the PPDU.

In a second step 112 the AP terminates the ongoing transmission of the data unit before the estimated transmission time of the data unit. In an embodiment, the AP evaluates if it makes sense (i.e. if it is useful) to perform a truncation based on the remaining duration of TXOP and an ongoing PPDU transmission.

In a third step 113 the AP receives from and/or transmits to the third communication device (i.e. the pSTA) the preemptive data unit within the remaining duration of the truncated data unit or within the remaining duration of the transmit opportunity. In an embodiment the AP generates, if the truncation conditions are satisfied, a further truncation primitive that can be issued by the MAC to the PHY, indicating to the PHY to perform the truncation of the ongoing PPDU.

Figure 17:
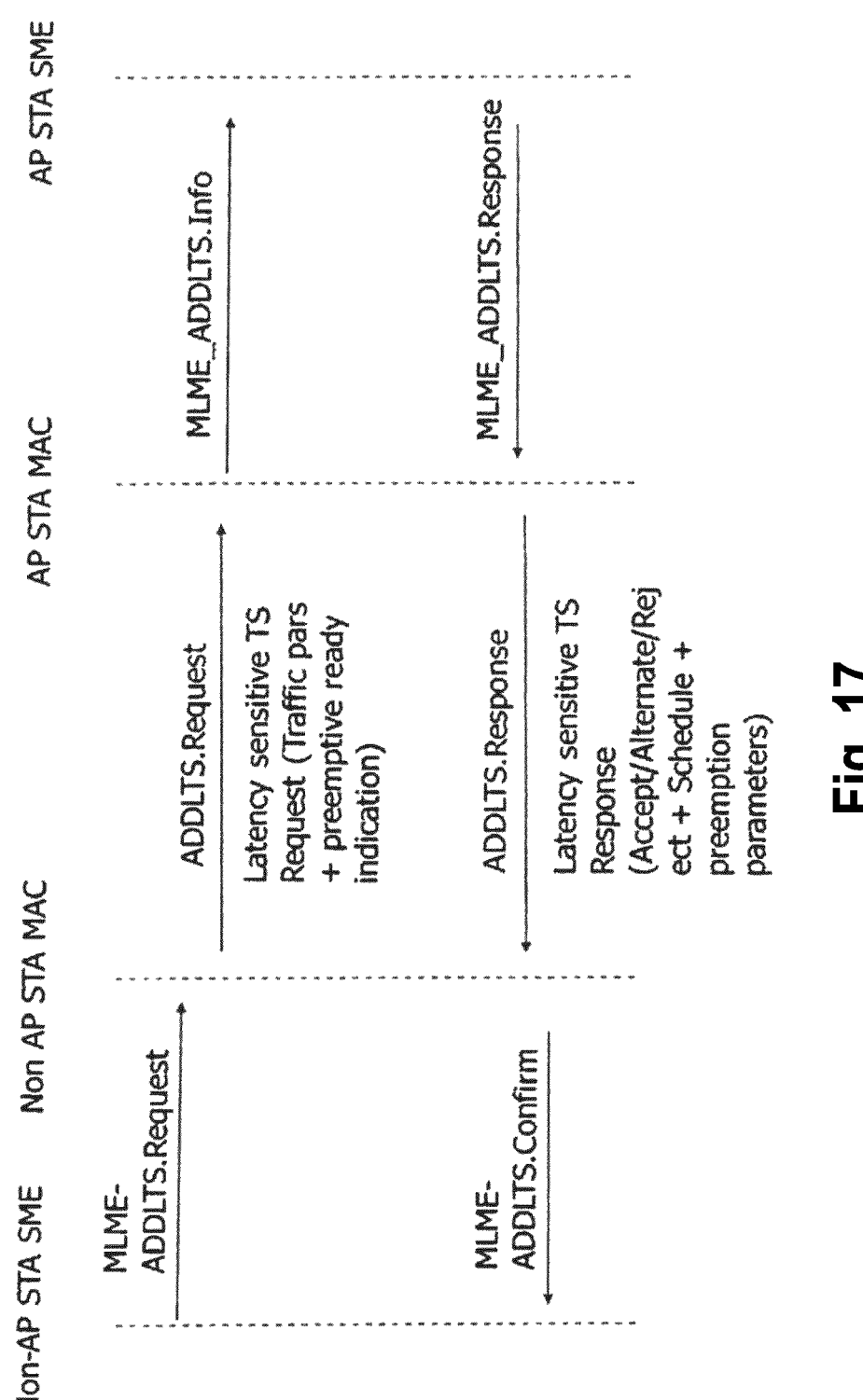
FIG. 17 shows a diagram illustrating the operation of a session in which a non-AP station initiates a low latency traffic session.

Another embodiment deals with establishing low latency sensitive traffic stream (LLTS) sessions to inform about the low latency traffic stream characteristics and preemption parameters. In one implementation of this embodiment a non-AP STA having low latency sensitive traffic may establish a low latency traffic session with the AP with which it is associated. FIG. 17 shows a diagram that illustrates the operation of such a session.

When setting up such a session the non-AP STA (having a station management entity (SME) and a MAC) informs its counterpart of the traffic characteristics (e.g., periodicity, duration) and requirements (e.g., in points of data rate and latency bounds). Furthermore, it may inform the AP (having a SME and a MAC) that it is preemption-ready. In this case, it may additionally indicate which preemption related parameters it can support, e.g., if it can continuously or only periodically listen during the reception of a PPDU, how often it can perform CCA during a PPDU). Including these parameters within the latency traffic session request is only one possible implementation. An alternative is to indicate preemption capability and parameters within fields of the capability elements that are exchanged between the STA and AP to which it is associated.

The AP responds to the latency traffic session request with an acceptance/rejection or suggestion for alternate parameters. Specifically regarding preemption, the AP may indicate if, in order to satisfy the traffic requirements in point of latency, it may resort to truncation of ongoing PPDUs, towards STAs other than the LLTS requester. Furthermore, in case truncations may be performed, it also indicates parameters of the truncations, e.g. a possible truncation granularity, i.e., after how many OFDM symbols a truncation may be performed or a set of possible values, out of which the exact one to be used is indicated in the preamble of the potentially truncatable PPDU. A schedule can be present within the response to the requester STA, which signals specific intervals in which the latency sensitive traffic stream may be transmitted and/or when an AP can request updates. Furthermore, it can indicate whether the potential truncations are possible within the specified time intervals corresponding to these schedules or also outside of these. Specifying time intervals and ensuring truncation that may only be performed within the specified intervals can contribute to improving the power saving behavior of the pSTAs. Otherwise, the requesting pSTAs should commit to continuously listening to PPDUs belonging to other STAs, constantly evaluating if intentional truncations are performed and furthermore verifying if the identifiers of the follow up transmissions are corresponding to themselves.

The specific schedules and periodicity can be defined at the Low Latency Sensitive Traffic Stream (LLSTS or LLTS) setup. Alternatively, these can be further announced by the AP, within the setup and/or announcement of scheduling intervals for particular STAs, e.g. individual or broadcast target wake up times. In order to allow the pSTA to determine these intervals, the AP assigns an allocation ID, to which the LLTS identifier together with identifiers of the pSTA and AP are mapped. In case of broadcast wake up time intervals, an AP may indicate, within control frames carrying setup or update configuration information, that transmissions during these intervals can be potentially truncated.

In case a low latency sensitive traffic has been established between the AP and pSTA, the traffic stream identifier of this traffic together with identifiers of the AP and pSTA will be contained in the PPDU transmitted after the truncation.

Similarly, in another implementation an AP being informed from its upper layers of the existence of a low latency sensitive traffic towards a non-AP STA may establish a low latency-sensitive session with the respective STA. In this case, if the AP can include within the LLSTSReservation, an indication of whether preemption is supported and with which parameters, e.g. granularity. Subsequently, the pSTA confirms whether it accepts the parameters, e.g. if it is capable of periodic listening with given OFDM granularity. The low latency sensitive traffic information and low latency sensitive traffic can be setup by reusing with some modifications the TS setup mechanisms defined in the IEEE 802.11 standards.

Another embodiment enables truncations only in specific time intervals, where pSTAs are known to be awake and able to process a follow-up transmission. In this embodiment traffic stream parameters such as periodicity or latency requirements, can be exchanged by the pSTA and AP, e.g. by a regular TS. However, preemption parameters are exchanged and activated within specifically defined service periods, i.e., time intervals in which more targeted data exchanges between the AP and particular pSTAs are performed. An example of such a time interval is a TWT SP (target wake time service period).

The pSTA and AP establish an interval in which potential transmissions corresponding to the low latency traffic characteristics can be performed. Within the setup phase, characteristics of a data exchange between the AP and pSTA can be negotiated, e.g., if the transmission from pSTA should be preceded by a trigger from the AP. Furthermore, preemption related parameters as described above, e.g. granularity, can be chosen according to the latency traffic characteristics, and the capabilities of both AP and pSTA and other traffic requirements from within the BSS. The chosen parameters can be further negotiated between the AP and pSTA. During an established TWT SP, the pSTA also commits to being awake thus capable of hearing PPDUs exchanged over the medium on a set of negotiated links. If, during a time interval established in this manner, the pSTA observes an early termination of a PPDU, the pSTA is allowed to set the PHY-CCA to idle, immediately after determining the truncation and subsequently follows the further rules defined within the respective time interval (i.e., waits for a follow-up PPDU from the AP, containing preemptive data unit, or a frame triggering the transmission from the pSTA or starts a transmission directly).

Figure 18:
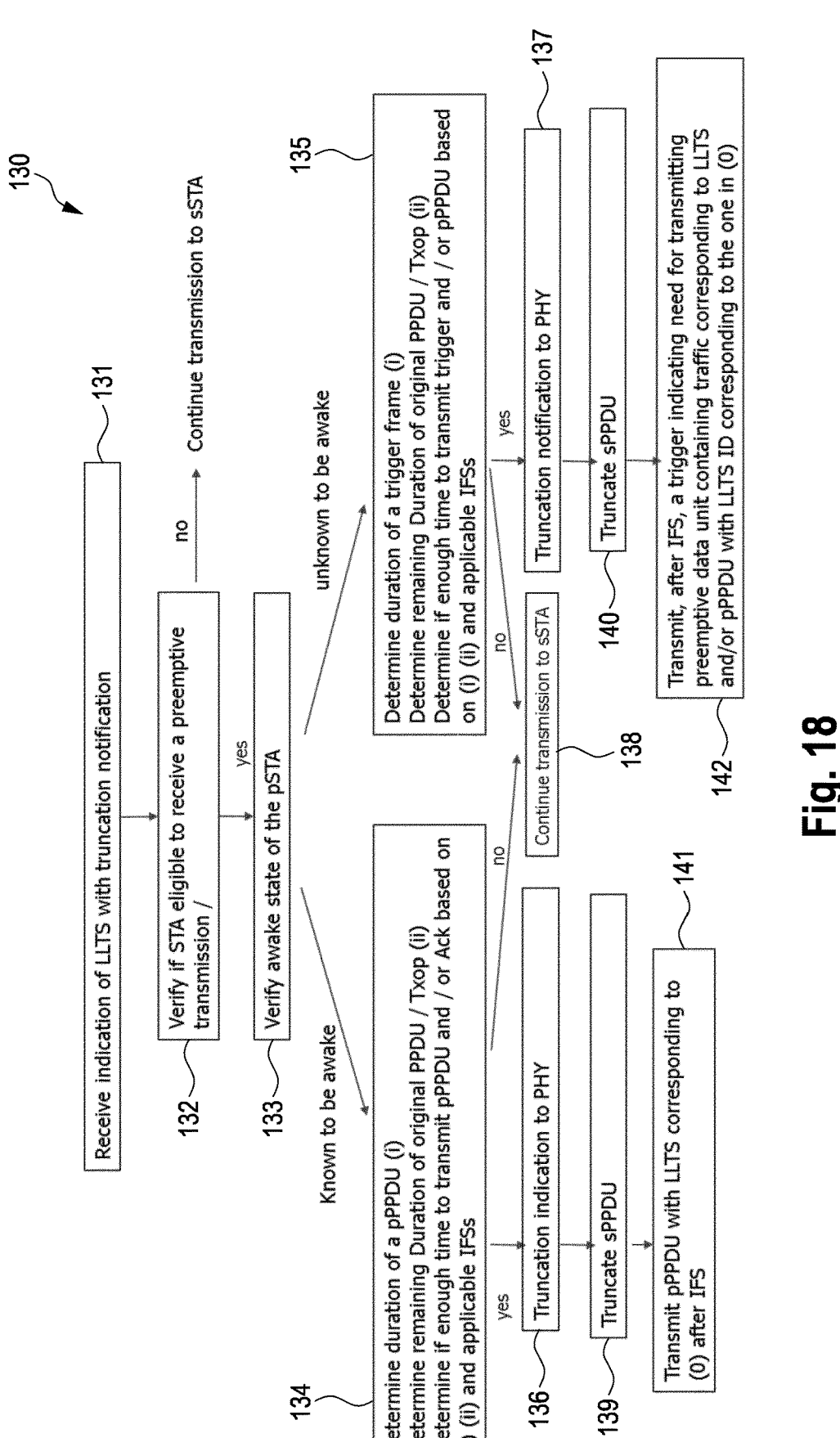
FIG. 18 shows a more detailed flow chart of another embodiment of a communication method of the first communication device according to the present disclosure.

FIG. 18 shows a more detailed flowchart of the first communication method 130 of the first communication device 100 (the AP) according to the present disclosure, which may be performed of by the circuitry 101. This flow chart particularly shows more details regarding the determination of whether to perform the truncation.

In a first step 131 an indication of LLTS may come from upper MAC layers of the AP (e.g., SME (system management entity)). While establishing a low latency session, one of the traffic characteristics is that it takes precedence over other traffic categories and ongoing transmissions may get truncated in order to satisfy the latency constraints of this traffic category. A notification of low latency traffic with truncation capabilities may have been sent from the pSTA via a different link (e.g. as depicted in FIG. 8 by the request frame sent by the pSTA).

In step 132 it is verified if the pSTA, for which the LLTS traffic is intended is eligible to receive a preemptive submission, e.g. if it has indicated capability to perform preemption and/or has been involved in establishing a low latency traffic stream session, in which it acknowledged it can process preemptive traffic and the session is active. If these conditions are not satisfied, the transmission to sSTA is continued, otherwise step 133 follows.

In step 133 it is verified if the pSTA is in awake state. This verification is optional. In case it is missing, the processing will go directly to one of steps 134 or 135 determining if to perform a truncation or not. In this case the choice of one or the other step may be predefined, e.g. in a standard. Step 135 is preferable for such a case, as based on the trigger frame it can be easily determined if the pSTA is awake and can transmit the follow up preemptive data. The information of whether a STA is awake within a particular interval can be established by means of target wake time intervals or by indication from the STA within previously exchanged frames, in which the STA commits to being awake. In an embodiment it may be defined whether as part of the low latency traffic stream session or within a follow-up schedule session, time intervals are defined within which the transmission is likely to occur and the pSTA commits to being awake. This is one more mechanism by which the AP can know the awake state of the STA.

Steps 134 and 135 are performing the operations that lead to determining if the remaining duration of the TXOP is enough to allow a preemptive transmission, or to allow triggering a preemptive transmission from the STA. Furthermore, these steps decide whether the frames should be sent with immediate Acknowledgment (in case the Acknowledgement transmission still fits within the TXOP duration) or whether the frames should be sent with a delayed Ack (which would happen in a further TXOP). If the remaining duration is enough to transmit at least one preemptive data unit or a schedule for the preemptive data unit or a CF END frame, then the truncation indication primitive to the PHY is issued (steps 136 and 137), stating that the sPPDU shall be truncated. Otherwise, STA transmission to sSTA is continued (step 138). Steps 132 to 135 thus basically determine what is expressed above by "if truncation makes sense". The truncation indication here refers to issuing a truncation primitive to the MAC and/or PHY in order to perform the truncation.

In steps 139 and 140 the sPPDU is truncated. Afterwards, in step 141 the pPPDU is transmitted with LLTS as indicated in step 131. In step 142, after IFS, a trigger indicating the need for transmitting a preemptive data unit containing traffic corresponding to LLTS and/or pPPDU with an LLTS ID corresponding to the one of step 131 is transmitted.

Figure 19:
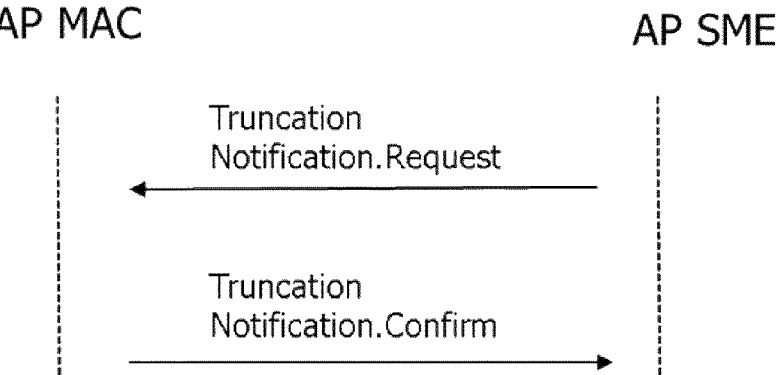
FIG. 19 shows a diagram illustrating the relation between interfaces in case of a truncation.

FIG. 19 shows a diagram illustrating the relation between interfaces in case of a truncation, in particular an AP MAC interface and an AP SME interface. The low latency traffic with truncation notification comes from the SME and is passed on to the MAC by a primitive marked in FIG. 19 as TruncationNotification.Request. The MAC determines based e.g. on steps 132 to 135 whether a truncation can be performed or not. Based on this determination it accepts the truncations and provides further indication to the PHY to perform the truncation or rejects the truncation requests and continues the ongoing transmission to the sSTA. The result of the determination is transmitted from the MAC to the SME in a primitive marked in FIG. 19 as TruncationNotification.confirm.

Figure 11:
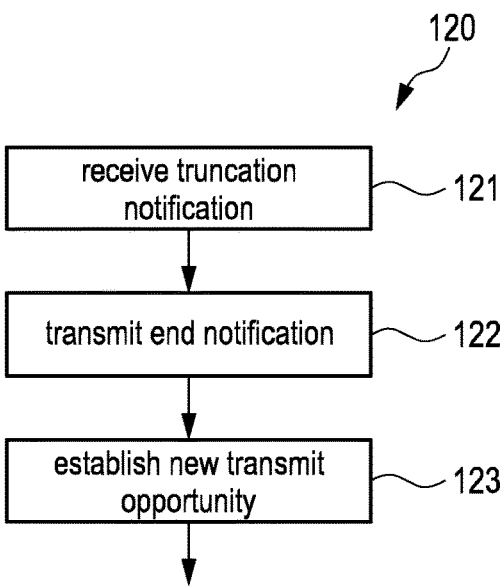
FIG. 11 shows a flow chart of another embodiment of a communication method of the first communication device according to the present disclosure.

FIG. 11 shows a flow chart of another embodiment of a first communication method 120 of the first communication device 100 (the AP) according to the present disclosure, which may be performed of by the circuitry 101. In a first step 121 the AP receives a truncation notification e.g., an indication of an LLTS with a truncation notification during an ongoing exchange of data units with the second communication device. In a second step 122, after performing similar verifications of truncation conditions as described in FIG. 18, i.e., if the recipient of the LLTS with truncation notification is eligible to receive a preemptive transmission, and the remaining duration of the transmit opportunity is enough to send at least the end notification frame, the AP transmits an end notification indicating the end of the current transmit opportunity before the end of the current transmit opportunity. In a third step 123 the AP establishes a new transmit opportunity with the third communication device. Hereby, the duration of said new transmit opportunity covers at least the transmission of the preemptive data to and/or the reception of the preemptive data from the third communication device. If the new transmit opportunity is obtained before the initially intended end of the sPPDU, in an embodiment it is proposed to limit the content of the newly obtained TXOP to contain only traffic corresponding to the LLTS that required the truncation, in case of the pSTA. Alternatively, depending on the requirements of the traffic that was truncated for the sSTA, the new TXOP can be defined to be limited to only LLTS for the pSTA and the remaining traffic from the sSTA from the originally intended TXOP.

Figure 12:
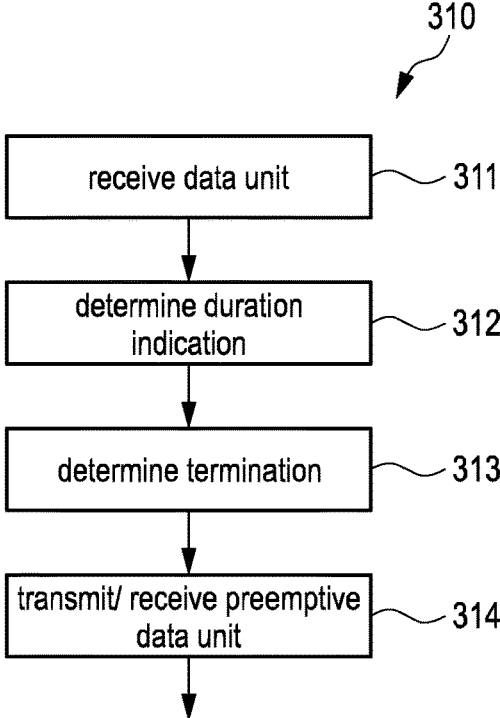
FIG. 12 shows a flow chart of an embodiment of a communication method of the third communication device according to the present disclosure.

FIG. 12 shows a flow chart of an embodiment of a third communication method 310 of the third communication device 300 (the pSTA) according to the present disclosure, which may be performed of by the circuitry 301. In a first step 311 the pSTA receives a data unit addressed to a second communication device 200 (the sSTA). In a second step 312 the pSTA determines a duration indication indicating the expected duration of an ongoing transmission of a data unit and/or of an ongoing transmit opportunity. As part of this step, the pSTA may check the duration of the ongoing PPDU from length information in the preambles of the received packet, which can be further used in determining if the early termination of the PPDU occurs. Also as part of this step a duration indication of the transmit opportunity within which the data exchange occurs, is determined from a MAC header or from an indication in the PHY preamble. This information is further used in the cases when the pSTA needs to transmit a preemptive data unit or a response to a preemptive data unit and thus has to choose transmit parameters in order to respect the TXOP boundary. In a third step the pSTA determine if transmission of a data unit has been terminated before the estimated transmission time of the data unit. Then, in a fourth step 314 the pSTA receives from and/or transmits to the first communication device a preemptive data unit within the remaining duration of the truncated data unit or within the remaining duration of the transmit opportunity.

In general the length of a PHY data unit is an information indicated within the PHY preamble of a PPDU to enable the receiver to calculate how long a PPDU is and implicitly how long the medium is busy with the ongoing transmission of the PPDU. Furthermore, a duration of a transmit opportunity may imply an exchange of more than the ongoing PPDU and is may be indicated in the PHY and/or MAC headers. In the context of the present disclosure, the length of the truncated data unit refers to the length of the data unit that was effectively transmitted by the first communication device to the second. Further the intended length of a truncated data unit refers to the Intended length of the data unit to the second communication device, i.e., without considering the truncation, and corresponds to the information within the preamble of the PPDU sent from the first to the second communication device. The duration of the data unit refers to the processing time of a data unit with the given length, the dependency between the two is given within the standard and thus the terms length and duration are interchangeably used when referred to a data unit. Furthermore, the intended duration of the TXOP refers to the intended duration of the transmit opportunity that was obtained for the communication between the first and the second communication device, before any truncation is considered.

According to one aspect the present disclosure presents solutions regarding TXOP boundaries and duration information. Currently, the duration information is set based on duration of the pending PPDUs to be exchanged within an obtained TXOP, i.e. PPDUs following the PPDU carrying the duration information. In the case of a truncation, however, an additional parameter should considered, which is the intended length of the original packet intended for the sSTA, assuming no truncation (denoted below as oTX-TIME) and/or the remaining time after a truncation is performed (denoted below as rTXTIME). This may be necessary for STAs which may have missed the original PPDU or TXOP information in order to prevent them from setting incorrect NAV. Furthermore, the new duration setting and pPPDU length should be chosen to avoid unfairness or confusion since many STAs may be on wait time until the expected end of the PPDU. Similarly, for TXOP of multiple frame exchanges, the duration should point to the same end of the TXOP that is shared, however taking into account the estimated processing time of the truncated PPDU.

Figure 13:
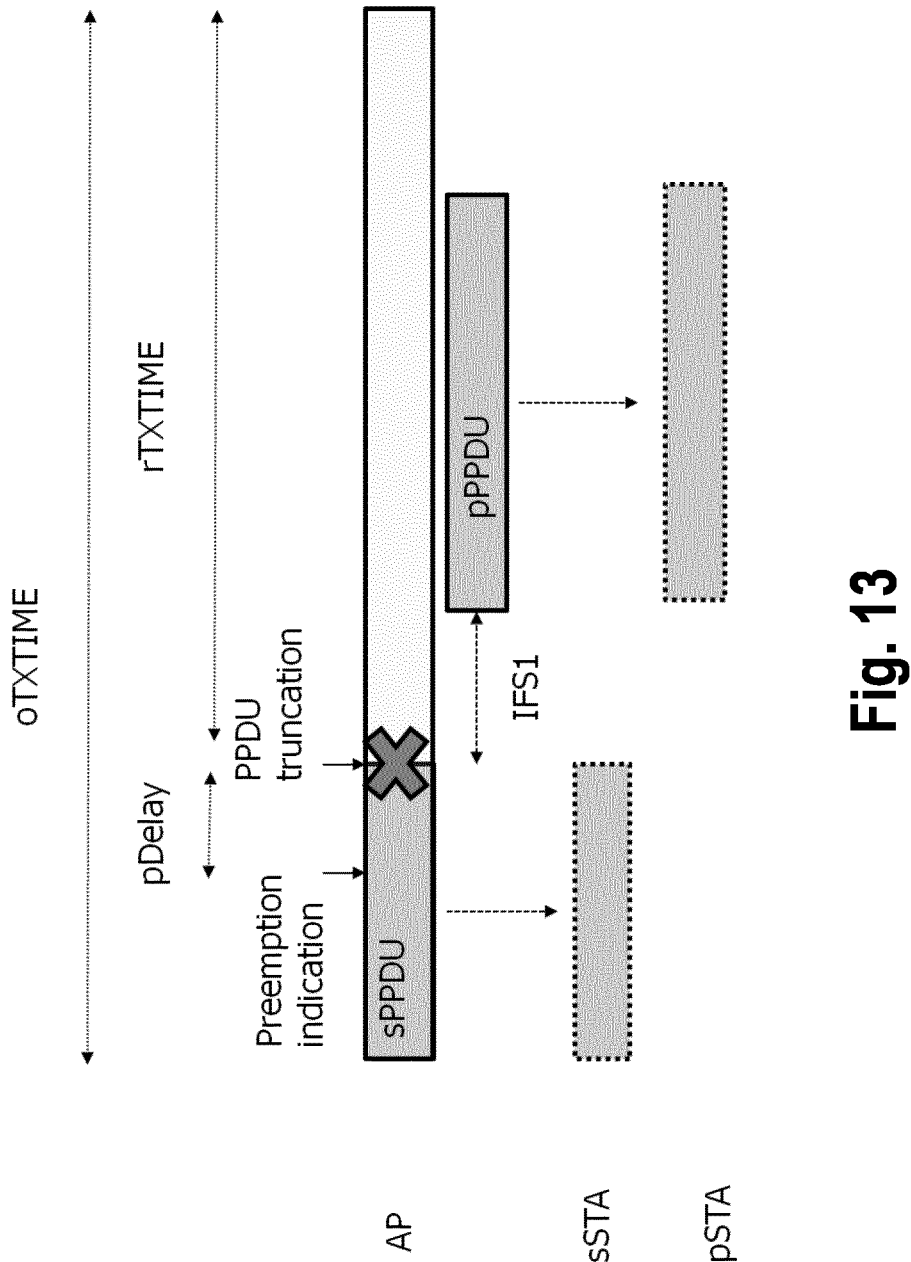
FIG. 13 shows a diagram illustrating an embodiment respecting transmission bounds.

In an embodiment, it is considered that the truncated PPDU was the last within its TXOP. FIG. 13 shows a diagram illustrating such an embodiment. In particular, for the first and second scenarios illustrated in FIGS. 6 and 7, when the pPPDU or pPPDU1 are DL PPDUs from the TXOP holder, the duration information is easily available. Upon reception of a preemption indication, the AP determines the earliest potential PPDU truncation time. Based on this it computes an rTXTIME, which is the remaining duration of the PPDU and determines the estimated duration of the PPDU intended for the pSTA. If $$TXTIME(pPPDU)+IFS_1 rTXTIME, \qquad (1)$$

then a pPPDU towards pSTA can be sent. In (1), TXTIME (pPPDU) represents the duration of the pPPDU transmission, and the IFS1 is an interframe space duration, which can be chosen as a SIFS or even shorter e.g., RIFS, as in this case there is no need to switch between reception and transmission modes The duration indication in the MAC header of the MPDUs contained in the pPPDU is in this case equal to $d_p$=rTXTIME−TXTIME(pPPDU)−IFS$_1$.

An additional optional measure to ensure that the TXOP boundary is understood by all STAs is to pad the pPPDU to the original time of the PPDU, in which case $d_p$=0. In this case, STAs which could not decode the MAC header are prevented from starting the backoff procedure at an early termination of the pPPDU, instead of waiting for the correct TXOP boundary.

Similarly, in another embodiment, in particular for the second scenario illustrated in FIG. 7, if the pPPDU contains frames which require acknowledgment, the AP determines whether an immediate Ack can be sent within the same interval. Thus, if $$TXTIME(pPPDU1)+IFS_1+SIFS+TXTIME(pPPDU2) \\ <rTXTIME, \qquad (2)$$

Where pPPDU2 is the PPDU carrying the Ack frame, it can set the Ack policy of the MPDUs within the pPPDU1 to Normal Ack, and the pSTA will reply within SIFS from the reception of the pPPDU1. In (2), TXTIME(pPPDU1) and TXTIME(pPPDU2) represent the duration of the transmission of pPPDU1 and PPDU2 respectively, and IFS1 is the interframe space duration, which similarly as above can be set as SIFS or RIFS and SIFS is a short interframe space time. Otherwise the AP sets the Ack policy towards delayed Ack and the pSTA will sent the acknowledgment within a future transmit opportunity after an appropriate request. Eq. (2) is also used in case pPPDU1 is intended to carry a trigger frame, in which case the AP determines whether there is enough time within the remaining rTXTIME for itself to send the trigger frame and for the pSTA to send the response frame. Similar to the previous embodiment a padding of pPPDU2 in case of termination earlier than TXOP boundary ensures additional protection.

It should be noted that rTXTIME can be computed until the end of the PPDU, or it can also be calculated such that a small margin after the PPDU is allowed. The variation may be bounded by some threshold, and it can be chosen e.g. similar to TXOP limit extension, or simply to cover a nominal value of the wake-up time of the RX PHY.

It should further be noted that In case the pPPDU1 contains a CF-END frame, the pSTA may need to contend in order to send the pPPDU2. pSTA may send the pPPDU2 if it can respect the end of the oTXTIME (plus optionally the margin).

In order to enable a pSTA to send a preemptive data unit or a response to a preemptive data unit within the transmit opportunity corresponding to the data exchange between the AP and the sSTA the following solutions may be envisioned. One optional solution is to send within a first PPDU after a truncation a trigger like frame, identifying the pSTA and requesting it to reset its NAV and transmit the preemptive data unit. The intra-BSS NAV rule may be also be adapted to allow a pSTA, that is directly addressed after an sPPDU with a preemptable indication, to ignore the intra-BSS NAV. Furthermore, a pSTA involved in an active low latency sensitive traffic stream session may be allowed to reset NAV upon determining an intentional early termination of a PPDU, if any indication of the low latency traffic corresponding to itself is present, e.g., if the PPDU transmission is performed during time intervals which were previously indicated as intervals in which transmission may be truncated, if the intervals correspond to a schedule that has been negotiated between the AP and the pSTA, if an indication of the traffic identifier corresponding to the LLTS setup between the AP and the pSTA is present within the pPPDU, if an allocation identifier corresponding to the LLTS is present within the sPPDU or a control frame. In both cases the STA may still need to follow the inter-BSS rules.

In another embodiment, it is considered that the truncated PPDU was not the last within its TXOP, e.g., the TXOP was containing response time for Ack from sSTA. When the truncated PPDU is not the last of the TXOP but should have originally be followed e.g. by an Ack/Block Ack, a possible operation is depicted in the diagram shown in FIG. 14. If the duration of the intended pPPDU1 is such that equation (1) can be satisfied but equation (2) cannot be respected, pPP-DUs padded until rTXTIME minus some margin and pPPDU2 containing the Ack is sent within SIFS of the termination. The margin may be chosen such that the end of pPPDU2 is within the TXOP limit and the start of the pPPDU2 after SIFS of termination of the pPPDU can be decoded by the other STAs in order to obtain correct information about the length of the PPDU.

Figure 14A:
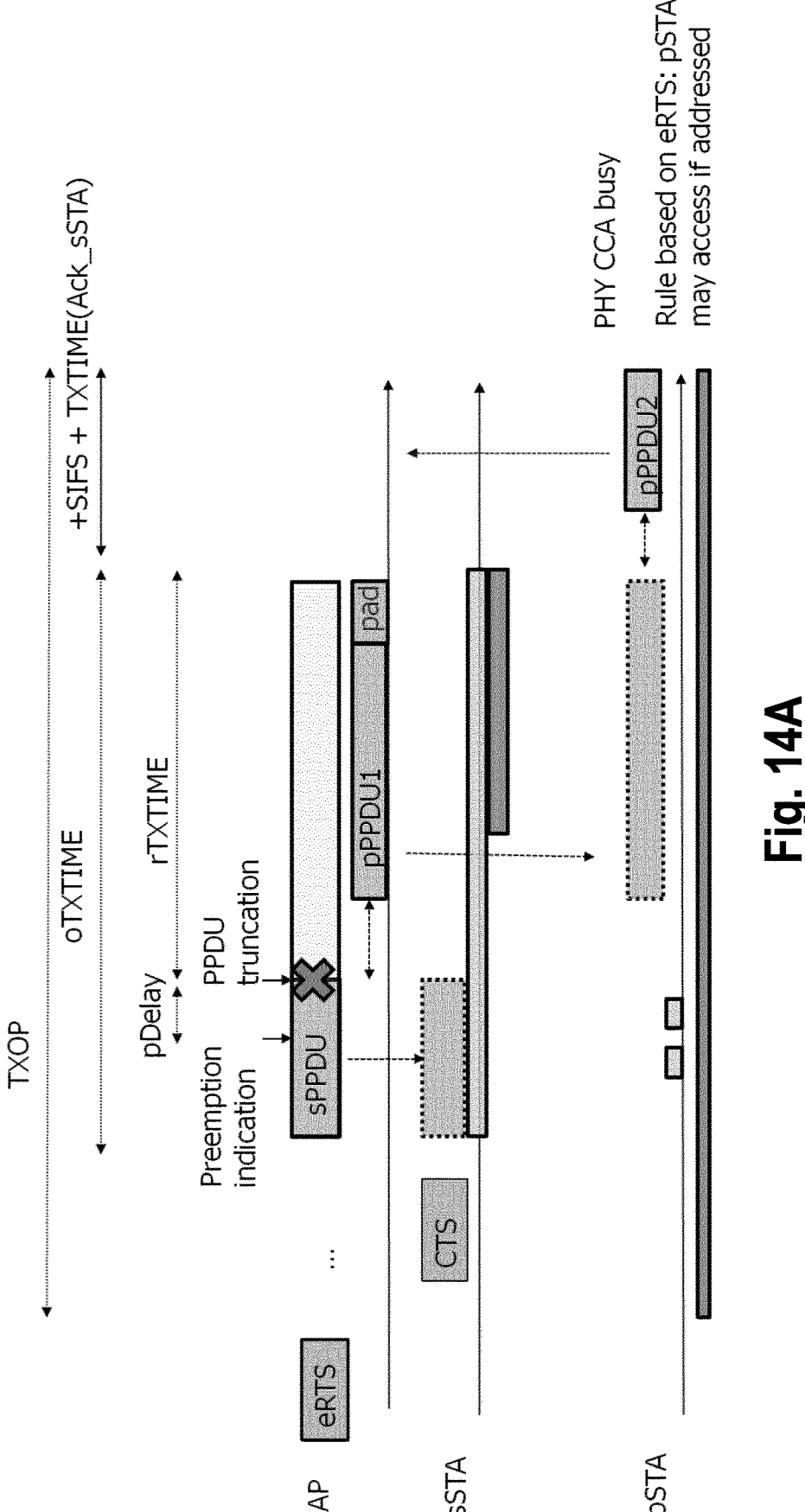
FIG. 14 shows diagrams illustrating the behavior in case the original TXOP contained an Ack time after sPPDU with TXTIME (pPPDU2)<TXTIME(Ack) (FIG. 14A) and with TXTIME (pPPDU2)>TXTIME(Ack) (FIG. 14B).
Figure 14B:
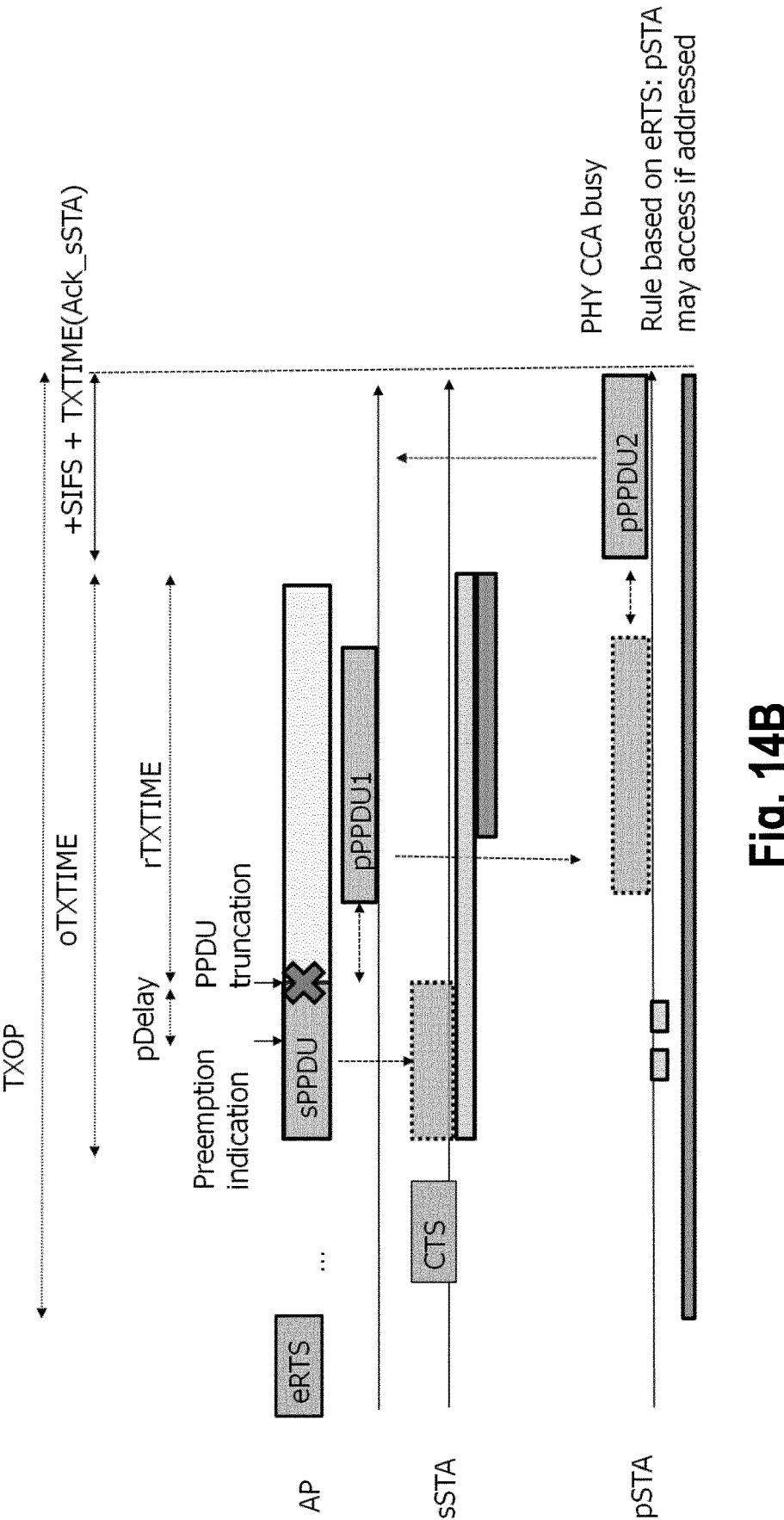

Depending on the length of the pPPDU2 versus the remaining duration of the TXOP two examples are shown in FIG. 14. FIG. 14A shows a diagram illustrating the behavior in case the original TXOP contained an Ack time after sPPDU and the transmission time of the pPPDU2 is smaller than that of the originally intended Ack, i.e., TXTIME(pPPDU2)<TXTIME(Ack). In the embodiment depicted in FIG. 14A, the pPPDU1 is padded such as to align the transmission of the pPPDU1 with the originally intended end of the sPPDU. The reason for this padding is to ensure that all STAs including legacy STAs and STAs which have been in intra-PPDU power save mode have the same reference to the end of the medium occupancy by PPDUs from the AP and thus to avoid collisions. FIG. 14B shows a diagram illustrating the behavior in case the original TXOP contained an Ack time after sPPDU and the transmission time of the pPPDU2 is larger than that of the originally intended TXTIME (pPPDU2)>TXTIME(Ack). In this case, the pPPDU2 transmission may be allowed to start before the initially intended end of the sPPDU, while risking a collision. It should be noted that having the TXOP defined to contain only the sPPDU, one ACK and the applicable SIFS is only one example. The description and techniques described here are generally applicable for the case in which the transmit opportunity is longer than the duration of the sPPDU. More precisely, when the duration of the pPPDU2 and applicable SIFS is smaller than the difference between the transmit opportunity boundary and the intended duration of the sPPDU, without a truncation, or equivalently, when the difference between the duration indication within the sPPDU and a SIFS is longer than the duration of the pPPDU, it is recommended to perform the padding of the pPPDU1 to align this to the originally intended end of the sPPDU.

If equation (2) can be respected and Ack is sent within oTXTIME, the AP may send a CF_end frame to terminate the TXOP.

In order for pSTA to be able to access the channel and send the pPPDU2 in the TXOP of sSTA, it is herein proposed in an embodiment that the control frame based on which the TXOP was obtained contains user information of pSTA e.g., an allocation identifier and possibly with pre-emptable information comprising either an empty resource allocation field or an indication of a preemption flag and traffic identifier of a low latency traffic stream identifier known at the pSTA from a low latency session setup. An implementation example of such a control frame is an RTS trigger modified to include user information fields about the pSTA as described above. Such a frame is referred to as enhanced RTS as depicted in FIGS. 14A and 14B. A pSTA may respond to an eRTS, which gives the AP additional information regarding the fact that the pSTA is awake and may receive a preemptive transmission, and may and which informs STAs in the respective channel that a preemptive transmission from the STA may be performed.

If the TXTIME(pPPDU2)>TXTIME(Ack_sSTA), however the pPPDU1 could finish before sPPDU, then the pPPDU2 transmission can start SIFS after the non-padded pPPDU1, as long as $$TXTIME(pPPDU1)+IFS_1+TXTIME(pPPDU2)<rTX\text{-}TIME+TXTIME(Ack\_sSTA)$$

is respected.

Since the preemptive data units are truncating an ongoing transmission, rules should be considered to not create unfairness or abuse over the wireless medium. For this purpose, it is herein proposed as an embodiment that the preemptive transmission that is carried within the pPPDU1 and/or pPPDU2 is only corresponding to the LLTS that required the truncation. Furthermore, the trigger frames, requesting the transmission of the pPPDU from pSTA, can be also defined to carry the indication that the traffic contained within the pPPDU from pSTA is only the one corresponding to the LLTS. In a further embodiment it is proposed to restrict the pSTA traffic but allow at least part of the remaining traffic of the sSTA to be sent within the TXOP, e.g., allowing the pPPDU2 to be sent simultaneously with data units from the sSTA in a TB PPDU mode. In case there is remaining time within the TXOP after the termination of the data exchange corresponding to the preemptive data units, the data exchange between sSTA and AP should be resumed.

In another embodiment, a pSTA, which needs to send an update to the AP based on the scheme in the third scenario shown in FIG. 8, should first decode the sPPDU preamble and if possible, the MAC Header of the MPDUs included in this in order to determine the initially intended duration of the PPDU and TXOP that was just truncated. Based on this information, it determines that an early termination of the sPPDU has occurred and consequently the remaining duration of the transmission opportunity. Based on this, it estimates if a pPPDU can be transmitted without exceeding oTXTIME. Basically, it also follows equation (1) with a corresponding IFS1. In this case IFS1 may at least be as long as SIFS (not smaller).

When transmitting the pPPDU, the duration indication would then may be set as follows:

$$\text{Duration indication } (pPPDU)=d+oTXTIME-IFS1-RXTIME(pPPDU)-RXTIME(sPPDU),$$

where d is the duration indication, determined from the MAC header of the sPPDU and is 0 if the sPPDU was the last of the TXOP or strictly positive otherwise. oTXTIME is determined based on the information in the length field of the PHY preamble of the sPPDU. RXTIME(sPPDU) represents here the duration of the effective transmission of the AP to the sSTA from the intended sPPDU and from pSTA perspective represents the time it elapsed from the moment of detecting the sPPDU packet until detecting the early termination. The RXTIME(pPPDU) represents the estimated duration of the pPPDU to be sent by the pSTA to the AP. The pSTA may choose the transmission parameters of the pPPDU in order to satisfy the equation above.

The pPPDU duration should be preferably chosen to not exceed the intended end of the sPPDU, even when the transmit opportunity boundary would be still respected, i.e., the original TXOP duration is larger than the sum of oTXTIME, one SIFS and the excess time. The reason is that, legacy STAs would be incapable of decoding the correct duration information and are only refraining from accessing the channel based on legacy length information in the preamble. Thus, they refrain from accessing the channel during oTXTIME after which they listen to the channel and if idle they may contend or transmit if backoff counter is 0. In cases where the pPPDU transmission is done with different parameters than the ones for which the sPPDU has been transmitted, e.g., different spatial direction from the AP, different power, or when the transmission is done from pSTA side, legacy STAs may misdetect the channel to be idle and start contending or even transmitting if their backoff counters are 0. This transmission would collide with the pPPDU transmission and thus would be detrimental for both parties involved. To avoid this problem it is suggested that the transmission of pPPDU is not exceeding the intended boundary of the sPPDU. Alternatively, if exceeded, it should be for a time interval smaller than the one, which may cause a collision to happen. This time interval can be SIFS or a function of SIFS and Slot time corresponding to the shortest duration after an estimated end of the sPPDU when a transmission from another STA, with a SIFS tolerance within standard limits may access the channel.

The intra-BSS NAV may be adapted to allow the pSTA in the third scenario to send the pPPDU. After a PPDU sent with a preemptable Flag, a pSTA is allowed to ignore the intra-BSS NAV but may still need to follow the inter-BSS rules if directly addressed, if it correctly decoded at least the PHY preamble and has correct information about the TXOP duration on the link. Furthermore, a pSTA involved in an active low latency sensitive traffic stream session may reset NAV upon determining an intentional early termination of a PPDU, if any indication of the low latency traffic corresponding to itself is present, e.g., if the PPDU transmission is performed during time intervals which were previously indicated as intervals in which transmission may be truncated, if the intervals correspond to a schedule that has been negotiated between the AP and the pSTA, if an indication of the traffic identifier corresponding to the LLTS setup between the AP and the pSTA is present within the pPPDU, if an allocation identifier corresponding to the LLTS is present within the sPPDU or if a negotiation has been performed over a different link.

The duration indicator is preferably transmitted within the header of the pPPDU1. The duration indication being sent is not exactly the same as the one based on what the decision was made (it may be conceptually similar but can have a different form, e.g. determining if pPPDU fits within oTX-TIME is done with complete pPPDU duration, whereas the indication that appears within the transmitted frames is with respect to the end of the pPPDU).

In the following channel access from AP and TXOP sharing aspects that may be used in further embodiments are discussed. The TXOP has been obtained by the AP for a traffic of a particular access category, which is called a primary AC for the TXOP. In order to be able to share the TXOP with the traffic of pSTA with a different AC, the following solutions can be envisioned in embodiments.

Figure 15:
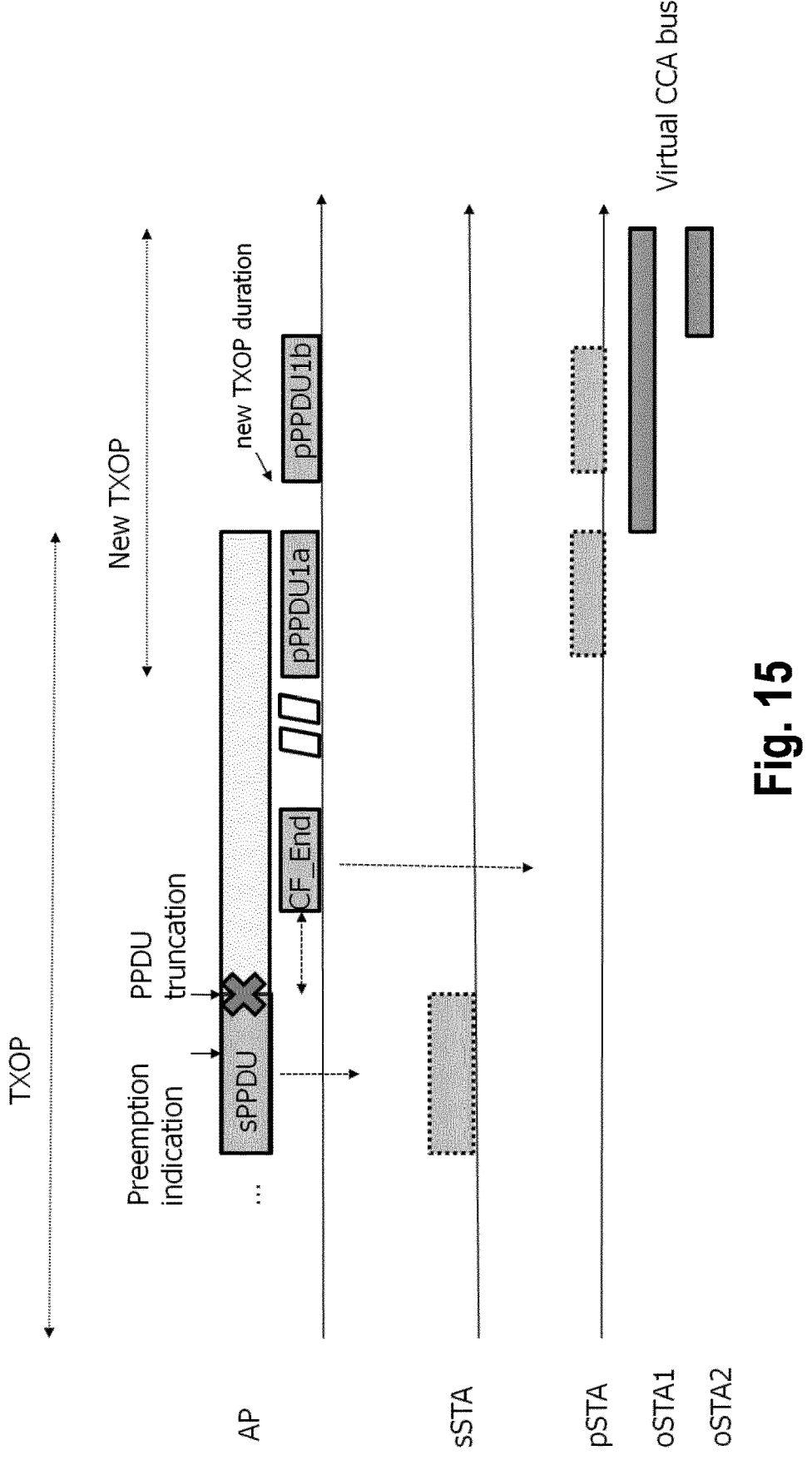
FIG. 15 shows a diagram of an embodiment using TXOP truncation and reset.

FIG. 15 shows a diagram of an embodiment using TXOP truncation and reset. The AP sends CF_end within the pPPDU1, by which the current TXOP is terminated. Then, the AP may contend for the medium for the AC of the low latency traffic for pSTA and obtains a new TXOP when the medium is free. If a new TXOP is obtained before oTX-TIME, a first pPPDU1 is sent to the pSTA aligned with oTXTIME boundary and a transmission is continued within pPPDU2, which indicates the new correct TXOP duration information to STAs that have been in wait mode during the expected transmission of the original PPDU. If the new TXOP is obtained after oTXTIME, no PPDU split is necessary. The new TXOP is obtained for the AC of the pSTA but may include additional sharing opportunities for the truncated traffic for sSTA.

Figure 16A:
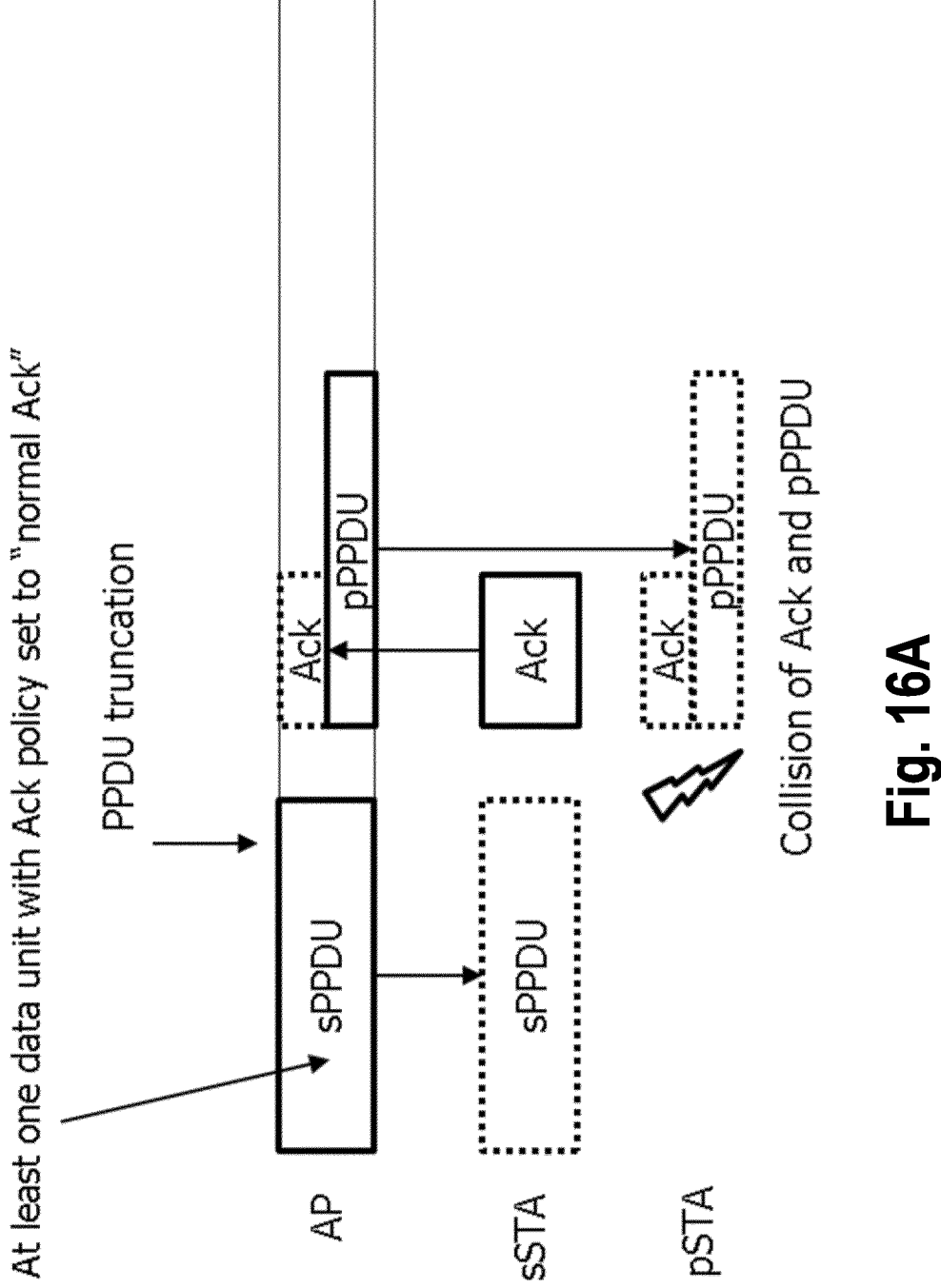
FIG. 16 shows diagrams illustrating a conventional acknowledgement policy setting and a new acknowledgement policy setting as proposed in an embodiment.
Figure 16B:
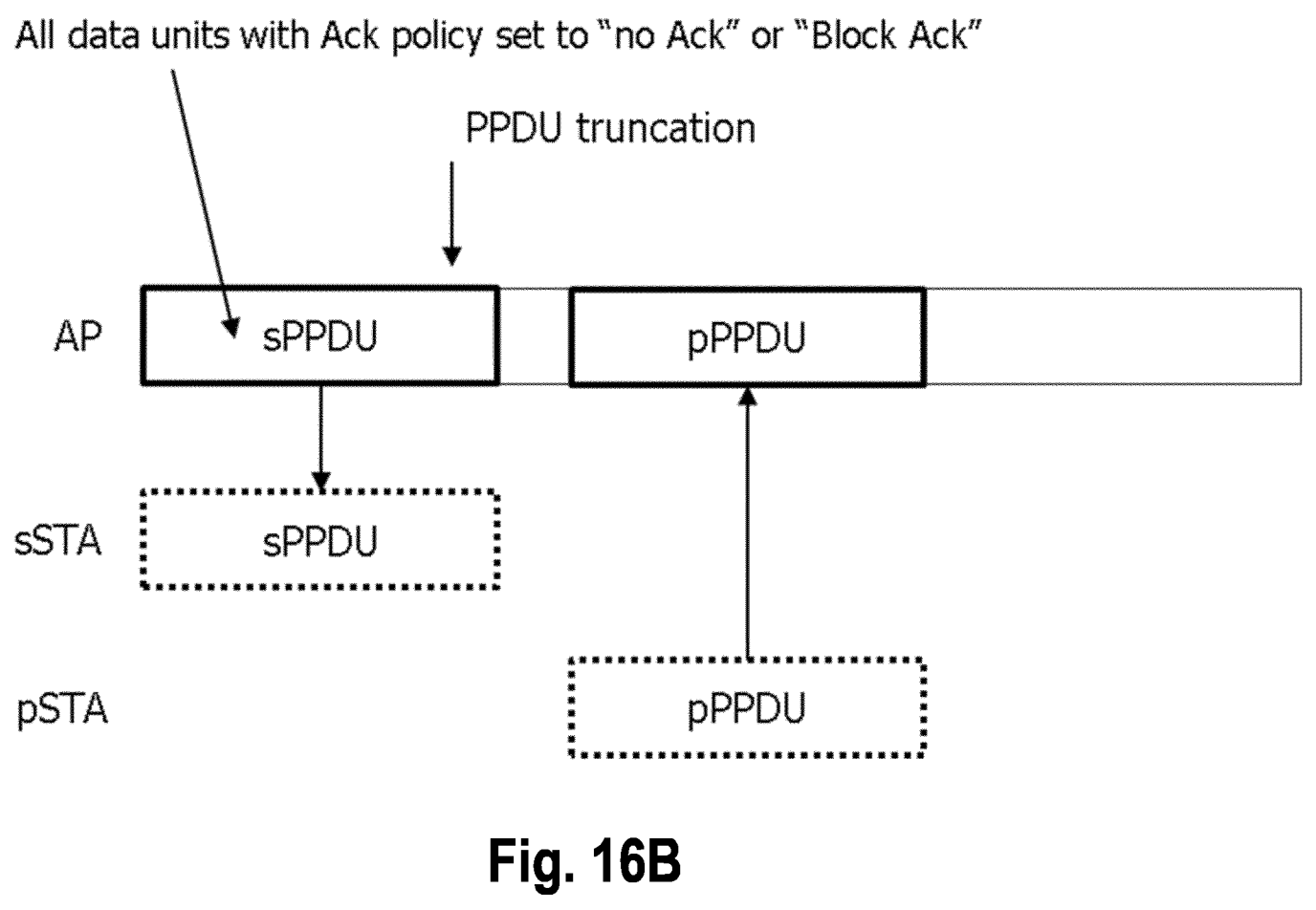

FIG. 16 illustrates another embodiment providing a change of the acknowledgement policy. FIG. 16A shows a diagram illustrating the conventional acknowledgement policy setting. FIG. 16B shows a diagram illustrating a new acknowledgement policy setting as provided in this embodiment.

Generally, any MAC data unit holds an Ack policy field that defines the behavior for an acknowledgement to this particular data unit. For the setting of this field three relevant options exist:

i) "Normal Ack or implicit Block Ack": The recipient transmits an Acknowledgement or Block Acknowledgement after the data unit or multiple data units have been received. This means that once the PPDU, which holds the one or more data units with this Ack policy, ended, an Acknowledgement or Block Acknowledgement is transmitted SIFS after the PPDU ended.

ii) "No Ack": The recipient takes no action upon receipt of the data unit.

iii) "Block Ack": The recipient takes no action upon the receipt of the data unit except for recording the reception state internally. The recipient can expect a Block Acknowledgement Request frame in the future to which it responds with a Block Acknowledgement, SIFS after the PPDU, which holds the Block Ack Request frame, ended.

Thus, if an ongoing exchange of data units is truncated and at least one data unit defines "Normal Ack or implicit Block Ack" as its Ack policy, an acknowledgement will be transmitted in response to the truncated PPDU. This clearly stops or hinders the transmission of a preemptive data unit to a different communication device (pSTA). Either the Acknowledgement needs to be received before a pPPDU is transmitted or it comes to a collision of the pPPDU and the Ack, which is not desired. This problem is illustrated in FIG. 16A.

For this reason, the Ack policy of any data unit within an exchange of data units that can be truncated shall use an Ack policy of "No Ack" or "Block Ack". Thus, Acknowledgements from sSTA to AP are either avoided or provided on request, as shown in FIG. 16B.

According to another embodiment, when establishing a TXOP in which truncation may be required (e.g., there are RTA STAs with active sessions), this is done as an MU TXOP, with MU RTS indicating both the sSTAs and pSTAs. After a truncation, a simultaneous transmission of the pPPDU as well as a fragment of the remaining sPPDU is transmitted whereas adequate padding is chosen in order to respect the oTXTIME boundary as discussed above. In this case the pPPDU1 is an MU PPDU with duration information respecting the rules depicted in FIGS. 14A and 14B and the corresponding equations.

According to another embodiment, the TXOP sharing rules are redesigned to allow early TXOP truncation in case the access category of pSTA corresponds to a low latency sensitive traffic or allow TXOP sharing in case an indication of low latency traffic comes at the MAC interface.

In another embodiment transmission continuation for sSTA within the TXOP may be applied. An AP may request the Acks simultaneously for the two STAs. This can be indicated by a delayed BA Request with expected response SI FS after termination of the pPPDU. The response may be in TB PPDU. Since the pPPDU is sent from the AP, the sSTA can decode the TXTIME of the pPPDU and synchronize to this such as to ensure that it can participate in the TB PPDU transmission. This operation can be particularly effective if the preempted transmission is at the end of a TXOP and/or the truncated PPDU was the last within the TXOP.

The present disclosure may make use of one or more of the following embodiments:

The truncation request comes from the pSTA on a different link during the TXOP of the sSTA. As already discussed in more detail in the above, the first pPPDU can be a trigger frame requesting or allowing the pSTA to transmit preempted data units. The transmission after the truncation can be done to pSTA simultaneously with sSTA, while respecting the TXOP boundary and PPDU boundary conditions. An initial RTS that was used to enable the TXOP is sent such that pSTA (or a set to which pSTA belongs) is also addressed in the user fields (with some form of preemption indication but not necessarily with RU), which appears in the first part regarding the early discard but is important for channel access also.

Truncation may occur within predetermined time intervals which are advertised to the STAs (most importantly pSTA or a set to which pSTA belongs but can be done to all STAs associated with the AP) in which low latency traffic has priority and STAs other than low latency are prone to early termination. In an embodiment the original transmission resumes after the preemptive data unit was conveyed in case of a short preemptive unit.

Advantages of the present disclosure include one or more of improved latency for RTA station having higher priority traffic than an ongoing transmission and enablement of PPDU truncation. PPDU truncation provides gains in latency sensitive traffic; however, channel access mechanisms for supporting PPDU truncation are currently missing making it impossible to implement these type of schemes. This limitation is addressed in this disclosure.

The present disclosure thus proposes mechanisms for channel access in case of a preemptive transmission, in which an initial PPDU intended for one STA is truncated to allow data transmission for another STA with high priority traffic. The embodiments presented are particularly appropriate for applications requiring real time low latency communication. Methods to ensure correct distribution of information regarding channel occupancy, sharing and respecting transmission boundaries as well as fairness in the channel access for the STAs listening to the medium are presented.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. First communication device configured to communicate with a second communication device and a third communication device, the first communication device comprising circuitry configured to
   receive a truncation notification during an ongoing exchange of data units with the second communication device, the truncation notification indicating that the ongoing transmission of a data unit shall be truncated and a preemptive data unit shall be received from and/or transmitted to the third communication device,
   terminate the ongoing transmission of the data unit before the estimated transmission time of the data unit, and
   receive from and/or transmit to the third communication device the preemptive data unit within the remaining duration of the truncated data unit or within the remaining duration of the transmit opportunity, established between the first and the second communication devices for the ongoing data unit exchange.
2. First communication device as defined in any one of the preceding embodiments,
wherein the circuitry is configured to set in the ongoing exchange of data units with the second communication device the acknowledgement policy of a data unit to no acknowledgement or acknowledgement on request.
3. First communication device as defined in any one of the preceding embodiments,
wherein the circuitry is configured to
   transmit, as part of the ongoing exchange of data units with the second communication device, a first duration indicator indicating the intended duration of the transmit opportunity, and
   transmit or receive, after the truncation of the ongoing transmission of a data unit and as part of the reception or transmission of a data unit from or to the third communication data, a second duration indicator indicating the remaining duration of the intended transmit opportunity after the transmission of the preemptive data unit is completed.
4. First communication device as defined in embodiment 3, wherein the second duration indicator is determined based on one or more of the length of the truncated data unit, the intended length of the truncated data unit, the intended duration of the transmit opportunity and the length of at least one preemptive data unit.

5. First communication device as defined in any one of the preceding embodiments, wherein the circuitry is configured to terminate the ongoing transmission of the data unit only if the remaining duration of the intended transmission opportunity after performing the truncation of the ongoing data unit is equal to or larger than the expected duration of the transmission or reception of the preemptive data unit and any required response to the transmitted or received preemptive data unit or of a frame triggering or scheduling the transmission of the preemptive data unit and any required response to the transmitted or received frame.

6. First communication device as defined in embodiment 3, wherein the circuitry is configured to generate the second duration indicator indicating the difference between the remaining duration of the truncated data unit and the duration of the preemptive data unit or of a trigger frame triggering transmission from the third communication device or scheduling a preemptive data exchange with the third communication device or of a contention free end frame and one interframe space interval.

7. First communication device as defined in any one of the preceding embodiments, wherein the circuitry is configured to subtract the duration of the preemptive data unit and the duration of an acknowledgement and/or an interframe space from the remaining duration of the truncated data unit or to subtract the duration of a first preemptive data unit to be transmitted to the third communication device, the duration of a second preemptive data unit to be received from the third communication device and two interframe spaces from the remaining duration of the truncated data unit and to generate the second duration indicator indicating the result of said subtraction.

8. First communication device as defined in any one of the preceding embodiments, wherein the circuitry is configured to add a safety margin to the computed duration indicated by the second duration indicator, the safety margin corresponding to a wakeup time of the third communication device or a transmit opportunity extension or a set value, depending on a short interframe time, a slot time and or a tolerance level for the short interframe time.

9. First communication device as defined in any one of the preceding embodiments, wherein the circuitry is configured, if a first preemptive data unit shall be transmitted to or received from the third communication device and a second preemptive data unit shall be received from or transmitted to the third communication device and if the intended transmit opportunity of the second communication device contains a transmission time for one or more further PHY data units , to transmit the first preemptive data unit to the third communication device and to receive the second preemptive data unit from the third communication device, wherein an amount of padding data is added to the first preemptive data unit so that the end of the first preemptive data unit corresponds to the end of the intended duration of the data unit transmitted to the second communication device, in the absence of a truncation, if the duration of the second preemptive data unit is shorter than the duration of the transmission time of the one or more further PHY data units.

10. First communication device as defined in any one of the preceding embodiments, wherein the circuitry is configured, if a first preemptive data unit shall be transmitted to or received from the third communication device and a second preemptive data unit shall be received from or transmitted to the third communication device and if the intended transmit opportunity of the second communication device contains a transmission time for one or more further PHY data units, to initiate the transmission of the preemptive data unit before the estimated duration of the ongoing data unit plus an interframe space time interval, in case the duration of the second preemptive data is longer than the transmission time of the one or more further PHY data units.

11. First communication device as defined in embodiment 5, wherein the circuitry is configured to subtract the duration of a first preemptive data unit to be transmitted to the third communication device, the duration of a second preemptive data unit to be received from the third communication device and an interframe space from the sum of the intended length of the truncated data unit and a data unit indicator, the data unit indicator being an integer larger than zero and indicating that the truncated data unit has not been the last data unit to be transmitted within the current transmit opportunity and indicating the expected duration of the ongoing transmission duration, and to determine, based on the result of said subtraction, whether to perform a truncation of the data unit transmission to the second communication device, the truncation notification indicating that a truncation of the ongoing data unit should be performed.

12. First communication device as defined in any one of the preceding embodiments, wherein the circuitry is configured to subtract the reception duration of the preemptive data unit and an interframe space from the intended duration of the truncated data unit if the truncated data unit has been the last data unit to be transmitted within the current transmit opportunity, and to determine, based on the result of said subtraction, whether to perform a truncation of the data unit transmission to the second communication device, the truncation notification indicating that a truncation of the ongoing data unit should be performed.

13. First communication device as defined in any one of the preceding embodiments, wherein the circuitry is configured to perform a truncation of the ongoing data exchange with the second device as a result of receiving a notification indicating the request to transmit or receive a low latency sensitive traffic, from the third communication device, during the transmit opportunity of the second communication device, wherein the notification is received on a different link than the one on which the ongoing data exchange between the first and second communication device is performed.

14. First communication device as defined in any one of the preceding embodiments, wherein the circuitry is configured to transmit, as first preemptive data unit, a trigger frame requesting and/or allowing the third communication device to transmit further preemptive data units during the transmit opportunity obtained for the data exchange between the first communication device and the second communication device or a frame scheduling a preemptive data exchange with the third communication device.

15. First communication device as defined in any one of the preceding embodiments,
wherein the circuitry is configured to transmit preemptive data units to the third communication device simultaneously with the transmission and/or reception of data units to the second communication device, and/or to receive preemptive data units from the third communication device simultaneously with data units from the second communication device and/or to transmit preemptive data units to the third communication device that only contain traffic corresponding to the low latency traffic stream identifier, established between the first and third communication device before the ongoing data exchange.

16. First communication device as defined in any one of the preceding embodiments,
wherein the circuitry is configured to transmit as part of establishing the transmit opportunity with the second communication device, within which the ongoing data exchange is performed, one or more of a control frame indicating one or more of a potential preemption, a user field indicating the third communication device as intended receiver of a preemptive data unit, and a user field indicating a set of communication devices, from which the third communication device identifies itself as intended participant in a potential preemptive data exchange, and/or to perform a truncation of the ongoing transmission of a data unit in predefined time intervals negotiated with the third communication device before the ongoing transmit opportunity.

17. First communication device as defined in any one of the preceding embodiments,
wherein the circuitry is configured to perform a truncation of the ongoing transmission of a data unit in predefined time intervals negotiated with the third communication device before the ongoing transmit opportunity.

18. First communication device as defined in any one of the preceding embodiments,
wherein the circuitry is configured to resume the original exchange of data units with the second communication device after the transmission or reception of the preemptive data unit and any required response to the transmitted or received preemptive data unit.

19. First communication device as defined in any one of the preceding embodiments,
wherein the circuitry is configured to transmit the duration indicator in a MAC header of an MPDU included in the preemptive data unit.

20. First communication device as defined in any one of the preceding embodiments,
wherein the circuitry is configured to add padding data to the preemptive data unit before transmitting the preemptive data unit.

21. First communication device as defined in any one of the preceding embodiments,
wherein the circuitry is configured to add an amount of padding data to the preemptive data unit so that the end of the preemptive data unit corresponds to the end of the truncated data unit if it had not been truncated.

22. First communication device configured to communicate with a second communication device and a third communication device, the first communication device comprising circuitry configured to
receive a truncation notification during an ongoing exchange of data units with the second communication device, the truncation notification indicating that the ongoing transmission of a data unit shall be truncated and a preemptive data unit shall be received from and/or transmitted to the third communication device, transmit an end notification indicating the end of the current transmit opportunity before the end of the current transmit opportunity, and
establish a new transmit opportunity with the third communication device, wherein the duration of said new transmit opportunity covers at least the transmission of the preemptive data to and/or the reception of the preemptive data from the third communication device.

23. First communication device as defined in embodiment 22,
wherein, if the duration of the preemptive data unit is longer than the current transmit opportunity duration if it had not been truncated minus the duration of the end indication and minus the duration of the establishment of the transmit opportunity with the third communication device, said difference representing a remaining net duration, transmit a first part of the preemptive data unit before said remaining net duration and a second part of the preemptive data unit after said remaining net duration.

24. First communication device as defined in any one of embodiments 22 to 23,
wherein the duration of the new transmit opportunity is configured to not exceed the current transmit opportunity duration without truncation minus the duration of the end indication and minus the duration of the establishment of the transmit opportunity with the third communication device.

25. First communication device as defined in embodiment 24,
wherein the circuitry is configured to transmit the first part of the preemptive data unit aligned with the end of current transmit opportunity if it had not been truncated.

26. First communication device as defined in embodiment 24 or 25,
wherein the circuitry is configured to transmit the first part and/or a second part of the preemptive data unit in a multi user PPDU comprising data units for the second communication device and data units for the third communication device.

27. First communication device as defined in any one of embodiments 22 to 26,
wherein the new transmit opportunity can be shared with the second communication device for the exchange of at least part of the remaining traffic intended for the current transmission opportunity.

28. First communication device as defined in any one of the preceding embodiments,
wherein the circuitry is configured to end or to share the current transmit opportunity with the third communication device in case an access category of the traffic to be exchanged with the third communication device indicates a low latency sensitive access category and/or in case a low latency sensitive session had been established between the first and the third communication device before the ongoing data exchange.

29. First communication device as defined in any one of the preceding embodiments,
wherein the preemptive data unit contains low latency traffic with parameters established within a setup phase performed prior to the ongoing data transmission.

30. First communication device as defined in any one of the preceding embodiments,
wherein the transmission of the preemptive data unit does not exceed the initially intended duration of the intended data unit or does not exceed by more than a short interframe space or a function of a short interframe space, slot time and interframe tolerance level.

31. Third communication device configured to communicate with a first communication device, the third communication device comprising circuitry configured to receive a data unit addressed to a second communication device, determine a duration indication indicating the expected duration of an ongoing transmission of a data unit and/or of an ongoing transmit opportunity, determine if transmission of a data unit has been terminated before the estimated transmission time of the data unit, and receive from and/or transmit to the first communication device a preemptive data unit within the remaining duration of the truncated data unit and/or within the remaining duration of the transmit opportunity.

32. Third communication device as defined in embodiment 31, wherein the circuitry is configured to subtract the estimated reception duration of the truncated data unit, the reception duration of the preemptive data unit and an interframe space from the sum of the intended duration of the truncated data unit and a data unit indicator, the data unit indicator being an integer larger than zero and indicating that the truncated data unit has not been the last data unit to be transmitted within the current transmit opportunity and indicating the expected duration of the ongoing transmission duration, and to transmit a preemptive data unit with a duration indication, equal to said subtraction.

33. Third communication device as defined in embodiment 31 or 32, wherein the circuitry is configured to transmit the preemptive data unit such that the transmission of the preemptive data unit does not exceed the initially intended end of the truncated data unit or does not exceed by more than a short interframe space or a function of a short interframe space, slot time and interframe tolerance level the initially intended end of the data unit from the first to the second communication device.

34. Third communication device as defined in any one of embodiments 31 to 33, wherein the circuitry is configured to reset a network allocation vector, NAV, before the end of the ongoing transmit opportunity and/or before the end of the intended duration of the data unit from the first to the second communication device upon determination of one or more of:

an intentional early termination of the ongoing data exchange, reception of a trigger frame requesting a preemptive data unit transmission from the third communication device, reception of a preemptive data unit with a request for response and a time interval defined with potential truncation indication.

35. Third communication device as defined in any one of embodiments 31 to 34, wherein the circuitry is configured to determine if an indication of a low latency traffic identifier is present in the preemptive data unit or a trigger frame requesting the transmission of the preemptive data unit is received.

36. Third communication device as defined in any one of embodiments 31 to 35, wherein low latency traffic identifiers and preemption parameters have been negotiated in a phase prior to the ongoing data exchange.

37. Third communication device as defined in any one of embodiments 31 to 36, wherein the circuitry is configured to transmit or receive, after the truncation of the ongoing transmission of a data unit and as part of the reception or transmission of a data unit from or to the third communication data, a second duration indicator indicating the remaining duration of the intended transmit opportunity after the transmission of the preemptive data unit is completed.

38. Third communication device as defined in any one of embodiments 31 to 37, wherein the circuitry is configured to receive, as first preemptive data unit, a trigger frame requesting and/or allowing the third communication device to transmit further preemptive data units during the transmit opportunity obtained for the data exchange between the first communication device and the second communication device or a frame scheduling a preemptive data exchange with the third communication device.

39. First communication method for communicating with a second communication device and a third communication device, the first communication method comprising receiving a truncation notification during an ongoing exchange of data units with the second communication device, the truncation notification indicating that the ongoing transmission of a data unit shall be truncated and a preemptive data unit shall be received from and/or transmitted to the third communication device, terminating the ongoing transmission of the data unit before the estimated transmission time of the data unit, and receiving from and/or transmitting to the third communication device the preemptive data unit within the remaining duration of the truncated data unit or within the remaining duration of the transmit opportunity, established between the first and the second communication devices for the ongoing data unit exchange.

40. First communication method for communicating with a second communication device and a third communication device, the first communication method comprising receiving a truncation notification during an ongoing exchange of data units with the second communication device, the truncation notification indicating that the ongoing transmission of a data unit shall be truncated and a preemptive data unit shall be received from and/or transmitted to the third communication device, transmitting an end notification indicating the end of the current transmit opportunity before the end of the current transmit opportunity, and establishing a new transmit opportunity with the third communication device, wherein the duration of said new transmit opportunity covers at least the transmission of the preemptive data to and/or the reception of the preemptive data from the third communication device.

41. Third communication method for communicating with a first communication device, the third communication device comprising receiving a data unit addressed to a second communication device, determining a duration indication indicating the expected duration of an ongoing transmission of a data unit and/or of an ongoing transmit opportunity, determining if transmission of a data unit has been terminated before the estimated transmission time of the data unit, and receiving from and/or transmitting to the first communication device a preemptive data unit within the remaining duration of the truncated data unit and/or within the remaining duration of the transmit opportunity.

42. A non-transitory computer-readable recording medium that stores therein a computer program product, which, when executed by a processor, causes the method according to embodiment 39, 40 or 41 to be performed.

43. A computer program comprising program code means for causing a computer to perform the steps of said method according to embodiment 39, 40 or 41 when said computer program is carried out on a computer.

The invention claimed is:

1. A first communication device configured to communicate with a second communication device and a third communication device, the first communication device comprising circuitry configured to receive a truncation notification during an ongoing exchange of data units with the second communication device, the truncation notification indicating that ongoing transmission of a data unit shall be truncated and a preemptive data unit shall be received from and/or transmitted to the third communication device, terminate the ongoing transmission of the data unit before an estimated transmission time of the data unit, and receive from and/or transmit to the third communication device the preemptive data unit within a remaining duration of the truncated data unit or within a remaining duration of the transmit opportunity, established between the first and the second communication devices for the ongoing data unit exchange, wherein the notification is received on a different link than the one on which the ongoing data exchange between the first and second communication device is performed.

2. The first communication device as claimed in claim 1, wherein the circuitry is configured to set in the ongoing exchange of data units with the second communication device the acknowledgement policy of a data unit to no acknowledgement or acknowledgement on request.

3. The first communication device as claimed in claim 1, wherein the circuitry is configured to transmit, as part of the ongoing exchange of data units with the second communication device, a first duration indicator indicating an intended duration of the transmit opportunity, and transmit or receive, after the truncation of the ongoing transmission of a data unit and as part of the reception or transmission of a data unit from or to the third communication data, a second duration indicator indicating the remaining duration of the intended transmit opportunity after the transmission of the preemptive data unit is completed.

4. The first communication device as claimed in claim 1, wherein the circuitry is configured to terminate the ongoing transmission of the data unit only if a remaining duration of the intended transmission opportunity after performing the truncation of the ongoing data unit is equal to or larger than an expected duration of the transmission or reception of the preemptive data unit and any required response to the transmitted or received preemptive data unit, or of a frame triggering or scheduling the transmission of the preemptive data unit and any required response to the transmitted or received frame.

5. The first communication device as claimed in claim 1, wherein the circuitry is configured, if a first preemptive data unit shall be transmitted to or received from the third communication device and a second preemptive data unit shall be received from or transmitted to the third communication device and if an intended transmit opportunity of the second communication device contains a transmission time for one or more further PHY data units, to transmit the first preemptive data unit to the third communication device and to receive the second preemptive data unit from the third communication device, wherein an amount of padding data is added to the first preemptive data unit so that the end of the first preemptive data unit corresponds to an end of an intended duration of the data unit transmitted to the second communication device, in the absence of a truncation, if the duration of the second preemptive data unit is shorter than the duration of the transmission time of the one or more further PHY data units.

6. The first communication device as claimed in claim 1, wherein the transmission of the preemptive data unit does not exceed the initially intended duration of the intended data unit or does not exceed by more than a short interframe space or a function of a short interframe space, slot time and interframe tolerance level.

7. The first communication device as claimed in claim 1, wherein the circuitry is configured to perform a truncation of the ongoing data exchange with the second device as a result of receiving a notification indicating the request to transmit or receive a low latency sensitive traffic, from the third communication device, during the transmit opportunity of the second communication device.

8. The first communication device as claimed in claim 1, wherein the circuitry is configured to transmit, as first preemptive data unit, a trigger frame requesting and/or allowing the third communication device to transmit further preemptive data units during the transmit opportunity obtained for the data exchange between the first communication device and the second communication device or a frame scheduling a preemptive data exchange with the third communication device and/or to transmit preemptive data units to the third communication device simultaneously with the transmission and/or reception of data units to the second communication device, and/or to receive preemptive data units from the third communication device simultaneously with data units from the second communication device and/or to transmit preemptive data units to the third communication device that only contain traffic corresponding to the low latency traffic stream identifier, established between the first and third communication device before the ongoing data exchange.

9. The first communication device as claimed in claim 1, wherein the circuitry is configured to transmit as part of establishing the transmit opportunity with the second communication device, within which the ongoing data exchange is performed, one or more of a control frame indicating one or more of a potential preemption, a user field indicating the third communication device as intended receiver of a preemptive data unit, and a user field indicating a set of communication devices, from which the third communication device identifies itself as intended participant in a potential preemptive data exchange, and/or to perform a truncation of the ongoing transmission of a data unit in predefined time intervals negotiated with the third communication device before the ongoing transmit opportunity.

10. The first communication device as claimed in claim 1, wherein the circuitry is configured to end or to share a current transmit opportunity with the third communication device in case an access category of the traffic to be exchanged with the third communication device indicates a low latency sensitive access category and/or in case a low latency sensitive session had been established between the first and the third communication device before the ongoing data exchange.

11. A first communication device configured to communicate with a second communication device and a third communication device, the first communication device comprising circuitry configured to receive a truncation notification during an ongoing exchange of data units with the second communication device, the truncation notification indicating that the ongoing transmission of a data unit shall be truncated and a preemptive data unit shall be received from and/or transmitted to the third communication device, transmit an end notification indicating an end of a current transmit opportunity before the end of the current transmit opportunity, and establish a new transmit opportunity with the third communication device, wherein a duration of said new transmit opportunity covers at least the transmission of the preemptive data to and/or the reception of the preemptive data from the third communication device, wherein the notification is received on a different link than the one on which the ongoing data exchange between the first and second communication device is performed.

12. The first communication device as claimed in claim 11, wherein, if the duration of the preemptive data unit is longer than the current transmit opportunity duration if it had not been truncated minus the duration of the end indication and minus the duration of the establishment of the transmit opportunity with the third communication device, said difference representing a remaining net duration, transmit a first part of the preemptive data unit before said remaining net duration and a second part of the preemptive data unit after said remaining net duration.

13. The first communication device as claimed in claim 12, wherein the circuitry is configured to transmit the first part of the preemptive data unit aligned with the end of current transmit opportunity if it had not been truncated, and/or to transmit the first part and/or a second part of the preemptive data unit in a multi user PPDU comprising data units for the second communication device and data units for the third communication device.

14. A third communication device configured to communicate with a first communication device, the third communication device comprising circuitry configured to receive a data unit addressed to a second communication device, determine a duration indication indicating an expected duration of an ongoing transmission of a data unit and/or of an ongoing transmit opportunity, determine if transmission of a data unit has been terminated before an estimated transmission time of the data unit, reset a network allocation vector (NAV) upon determining that the transmission of the data unit has been terminated before the estimated transmission time of the data unit, and receive from and/or transmit to the first communication device a preemptive data unit within a remaining duration of the truncated data unit and/or within the remaining duration of the transmit opportunity.

15. The third communication device as claimed in claim 14, wherein the circuitry is configured to subtract the estimated reception duration of the truncated data unit, the reception duration of the preemptive data unit and an interframe space from the sum of the intended duration of the truncated data unit and a data unit indicator, the data unit indicator being an integer larger than zero and indicating that the truncated data unit has not been the last data unit to be transmitted within the current transmit opportunity and indicating the expected duration of the ongoing transmission duration, and to transmit a preemptive data unit with a duration indication, equal to said subtraction.

16. The third communication device as claimed in claim 14, wherein the NAV, is reset before the end of the ongoing transmit opportunity and/or before the end of the expected duration of the data unit from the first to the second communication device upon determination of one or more of:

an intentional early termination of the ongoing data exchange, reception of a trigger frame requesting a preemptive data unit transmission from the third communication device, reception of a preemptive data unit with a request for response and a time interval defined with potential truncation indication.

17. A first communication method for communicating with a second communication device and a third communication device, the first communication method comprising:

receiving a truncation notification during an ongoing exchange of data units with the second communication device, the truncation notification indicating that ongoing transmission of a data unit shall be truncated and a preemptive data unit shall be received from and/or transmitted to the third communication device, terminating the ongoing transmission of the data unit before an estimated transmission time of the data unit, and receiving from and/or transmitting to the third communication device the preemptive data unit within a remaining duration of the truncated data unit or within a remaining duration of the transmit opportunity, established between the first and the second communication devices for the ongoing data unit exchange, wherein the notification is received on a different link than the one on which the ongoing data exchange between the first and second communication device is performed.

18. The first communication method for communicating with a second communication device and a third communication device, the first communication method comprising:

receiving a truncation notification during an ongoing exchange of data units with the second communication device, the truncation notification indicating that ongoing transmission of a data unit shall be truncated and a preemptive data unit shall be received from and/or transmitted to the third communication device, transmitting an end notification indicating an end of a current transmit opportunity before the end of the current transmit opportunity, and establishing a new transmit opportunity with the third communication device, wherein a duration of said new transmit opportunity covers at least the transmission of the preemptive data to and/or the reception of the preemptive data from the third communication device, wherein the notification is received on a different link than the one on which the ongoing data exchange between the first and second communication device is performed.

19. A third communication method for communicating with a first communication device, the third communication device comprising:

receiving a data unit addressed to a second communication device, determining a duration indication indicating an expected duration of an ongoing transmission of a data unit and/or of an ongoing transmit opportunity, determining if transmission of a data unit has been terminated before an estimated transmission time of the data unit, resetting a network allocation vector (NAV) upon determining that the transmission of the data unit has been terminated before the estimated transmission time of the data unit, and receiving from and/or transmitting to the first communication device a preemptive data unit within a remaining duration of the truncated data unit and/or within a remaining duration of the transmit opportunity.

* * * * *